US012282338B1

(12) United States Patent
Gupta et al.

(10) Patent No.: US 12,282,338 B1
(45) Date of Patent: Apr. 22, 2025

(54) AUTOMATED GENERATION OF TRAINING DATA INCLUDING AIRBORNE OBJECT TRAJECTORY DATA

(71) Applicant: Amazon Technologies, Inc., Seattle, WA (US)

(72) Inventors: Harshul Gupta, Kent, WA (US); Francesco Giuseppe Callari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 18/059,667

(22) Filed: Nov. 29, 2022

(51) Int. Cl.
| | |
|---|---|
| *G05D 1/10* | (2006.01) |
| *G01S 19/01* | (2010.01) |
| *G05D 1/00* | (2006.01) |
| *G06T 5/50* | (2006.01) |

(52) U.S. Cl.
CPC ............. *G05D 1/101* (2013.01); *G01S 19/01* (2013.01); *G06T 5/50* (2013.01); *G06T 2207/20221* (2013.01); *G06T 2207/30241* (2013.01)

(58) Field of Classification Search
CPC . G01S 19/01; G06T 5/50; G06T 2207/20221; G06T 2207/30241
See application file for complete search history.

(56) References Cited

U.S. PATENT DOCUMENTS 11,256,958 B1 * 2/2022 Subbiah .............. G06F 18/2155

OTHER PUBLICATIONS

Pan, Xingyu et al. "A Deep Learning based Framework for UAV Trajectory Pattern Recognition", IEEE (Year: 2019).*

* cited by examiner

*Primary Examiner* — Aryan E Weisenfeld
*Assistant Examiner* — Godfrey Aleksander Maciorowski
(74) *Attorney, Agent, or Firm* — Athorus, PLLC

(57) ABSTRACT

Systems and methods to automatically generate training data including airborne object trajectory data may receive real trajectory data from within a first environment, receive imaging data associated with a second environment, and transform and/or modify the real trajectory data to synthetic trajectory data for the second environment. Then, the synthetic trajectory data may be superimposed within the imaging data of the second environment. In addition, images of an airborne object may be rendered along the synthetic trajectory data to generate training data that may be used to train machine learning models or algorithms for various computer vision applications.

19 Claims, 12 Drawing Sheets

AUTOMATED GENERATION OF TRAINING DATA INCLUDING AIRBORNE OBJECT TRAJECTORY DATA

BACKGROUND

Various machine learning models, such as neural networks, deep learning models, or other machine learning algorithms, may be used for various computer vision applications. Such machine learning models may be trained for various detection, recognition, classification, or other tasks using imaging data. However, the imaging data used to train machine learning models may generally be created or annotated using expensive and time-consuming manual processes. Accordingly, there is a need for systems to generate training data for machine learning models using substantially automated, efficient, and cost-effective methods, without sacrificing accuracy and reliability of the trained machine learning models.

DETAILED DESCRIPTION

Figure 1:
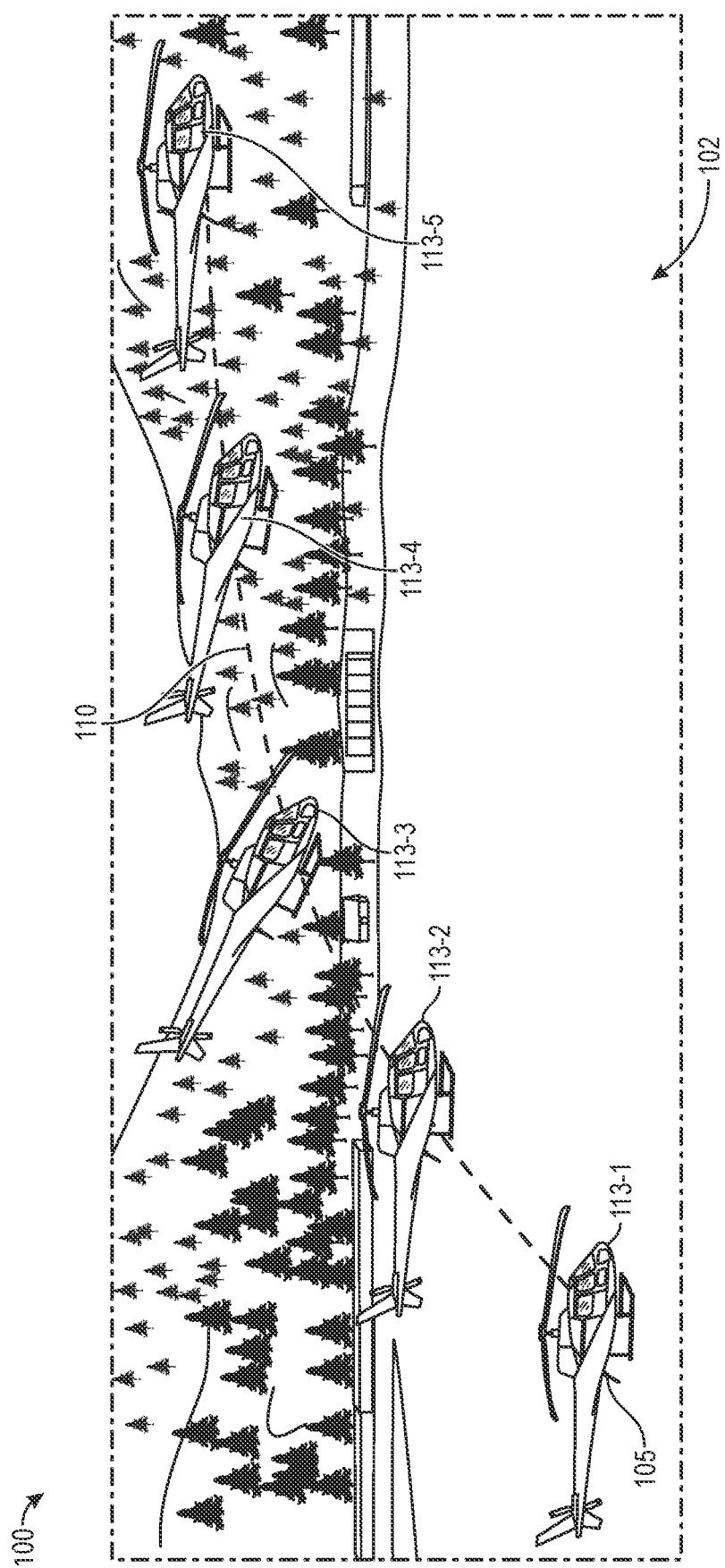
FIG. 1 is a schematic diagram of imaging data including an airborne object moving along a first trajectory, in accordance with implementations of the present disclosure.

As is set forth in greater detail below, implementations of the present disclosure are directed to systems and methods to generate training data including airborne object trajectory data for machine learning models in a substantially automated, efficient, and cost-effective manner.

Generally, in order to generate training data including airborne object trajectory data for various types of machine learning models or algorithms used in computer vision applications, an airborne object may need to be operated in an environment in proximity to an aerial vehicle, e.g., an unmanned aerial vehicle, having an imaging device. In this manner, the imaging device of the aerial vehicle may capture imaging data of the airborne object including trajectory data within an environment. In order to capture imaging data of various trajectory data for different types of airborne objects in different environments, a plurality of airborne objects may need to be operated in various environments in proximity to a plurality of aerial vehicles having imaging devices to capture different trajectory data for different types of airborne objects, different flight maneuvers, different encounter scenarios, and in different environments. As a result, such conventional methods to simulate encounter scenarios and generate training data including airborne object trajectory data may be very time-consuming, expensive, and potentially hazardous.

In example embodiments described herein, actual trajectory data for a single encounter scenario, e.g., real trajectory data, between an airborne object and an aerial vehicle in a first environment may be received, detected, measured, or captured. The actual trajectory data may include a plurality of points or vectors that define the actual trajectory of the airborne object. The actual trajectory data may include latitude, longitude, and/or altitude data at the plurality of points or vectors that may be detected, measured, or captured by a global positioning device, or other type of position determination device, onboard the airborne object. In addition, the actual trajectory data may also include orientation, bearing, or heading data that may be detected, measured, or captured by an inertial navigation system onboard the airborne object. Further, the actual trajectory data may also include timestamp information associated with the various data related to latitude, longitude, altitude, orientation, bearing, heading, or other data.

In example embodiments, imaging data for a plurality of environments may be captured by imaging devices associated with one or more aerial vehicles, e.g., unmanned aerial vehicles. In addition, latitude, longitude, and/or altitude data associated with the imaging data may be detected, measured, or captured by a global positioning device, or other type of position determination device, onboard the aerial vehicle. Moreover, orientation, bearing, or heading data associated with the imaging data may also be detected, measured, or captured by an inertial navigation system onboard the aerial vehicle. Further, timestamp information may also be associated with the imaging data, as well as the various data related to latitude, longitude, altitude, orientation, bearing, heading, or other data.

In example embodiments, in order to generate training data including airborne object trajectory data, the actual trajectory data for a single encounter scenario in a first environment, e.g., real trajectory data, may be transformed to a transformed trajectory in a second environment, e.g., synthetic trajectory data, that is different than the first environment. For example, the transformed trajectory may be adjusted based on an elevation difference between the first environment and the second environment. In addition, a desired point or vector, e.g., an end point vector, of the transformed trajectory may be selected, and the plurality of points or vectors of the actual trajectory may be transformed based on the desired point or vector of the transformed trajectory, as further described herein. Further, the transformed trajectory may be overlaid or superimposed onto imaging data of the second environment, and images of an airborne object may be rendered along the transformed trajectory to generate training data. In this manner, actual trajectory data for a single encounter scenario may be transformed, e.g., translated, rotated, shifted, or otherwise manipulated, to generate a plurality of transformed trajectories that may be superimposed within imaging data associated with a plurality of different environments.

In further example embodiments, the transformed trajectory in the second environment, e.g., synthetic trajectory data, may be modified in various ways. For example, the transformed trajectory may be translated to various locations within the second environment. In addition, the transformed trajectory may be rotated around one or more vertical axes within the second environment, e.g., to simulate different approach angles. Further, the transformed trajectory may be rotated relative to a horizontal plane within the second environment, e.g., to simulate different flight angles or maneuvers. Moreover, one or more portions of the transformed trajectory may be scaled within the second environment, e.g., stretched or contracted to simulate different speeds or velocities, different turning radii, or other aspects of flight maneuvers. Furthermore, the transformed trajectory may be systematically biased in a determined direction, e.g., to simulate effective wind from the determined direction. Alternatively, one or more portions of the transformed trajectory may be randomly biased or shifted in various different directions, e.g., to simulate wind, crosswinds, turbulence, and/or random errors or noise in measurements of the actual trajectory data.

In this manner, actual trajectory data for a single encounter scenario may be transformed, e.g., translated, rotated, shifted, or otherwise manipulated, and/or modified, e.g., translated, rotated, scaled, biased, or otherwise modified, to generate a plurality of transformed trajectories that may be superimposed within imaging data associated with a plurality of different environments. The plurality of transformed trajectories that are superimposed within imaging data of a plurality of different environments, and corresponding renderings of various types of airborne objects along the transformed trajectories within the imaging data, may comprise training data that can be used to train various machine learning models or algorithms for computer vision applications to detect, identify, classify, and/or recognize airborne objects and associated encounter scenarios. Accordingly, the systems and methods described herein may facilitate faster and more efficient training of machine learning models to perform various computer vision tasks, without sacrificing accuracy and reliability of such machine learning models.

Various image rendering algorithms, computer graphics applications, or other related visual data processing and rendering algorithms or techniques may be used to render and overlay images or three-dimensional models of airborne objects along transformed trajectories within imaging data of different environments. Further, the generated training data including airborne object trajectory data may be provided to various machine learning models, e.g., deep learning models, neural networks, or other types of machine learning algorithms or techniques, for various computer vision tasks or applications.

In order to overcome the expensive, time-consuming, and inefficient nature of machine learning methods, e.g., supervised machine learning methods, that utilize training data including actual or real trajectory data, the systems and methods described herein may facilitate semi-supervised, or unsupervised, machine learning methods in which training data including transformed or synthetic trajectory data may be generated substantially automatically in a faster, more efficient, and cost-effective manner. In additional example embodiments, semi-supervised machine learning methods may include various combinations of manually or conventionally generated training data including actual or real trajectory data, as well as automatically generated training data including transformed or synthetic trajectory data, as further described herein.

FIG. 1 is a schematic diagram 100 of imaging data including an airborne object moving along a first trajectory, in accordance with implementations of the present disclosure.

In example embodiments, an airborne object 105 may be navigating within an environment. As shown in FIG. 1, the airborne object 105 may comprise a helicopter, but in other example embodiments, the airborne object may comprise other types of airborne objects, aerial vehicles, helicopters, airplanes, jets, gliders, multirotor aircraft, drones, birds, or others.

The airborne object 105 may move along an actual trajectory 110 that is illustrated by a dashed line in FIG. 1. The actual trajectory 110 may comprise a plurality of points or vectors 113 along which the airborne object 105 moves or navigates over time, e.g., a first point or vector 113-1 at a first timepoint, a second point or vector 113-2 at a second timepoint, a third point or vector 113-3 at a third timepoint, a fourth point or vector 113-4 at a fourth timepoint, and a fifth point or vector 113-5 at a fifth timepoint.

During navigation of the airborne object 105 along the plurality of points or vectors 113, position data such as latitude, longitude, and altitude data at each of the plurality of points or vectors 113 may be detected, measured, or captured. The position data may be captured by global positioning system (GPS) devices, local positioning system sensors, or other types of position detection systems, devices, or sensors onboard or associated with the airborne object 105. In addition, timestamp information may also be detected, stored, or captured in association with the position data at each of the plurality of points or vectors 113.

In some example embodiments, in addition to position data, an object type or class associated with the airborne object 105 may also be detected, stored, or captured. For example, as shown in FIG. 1, the object type or class may indicate a helicopter or similar type of aerial vehicle as the type of airborne object 105. The object type or class may correspond with the plurality of points or vectors 113 during navigation of the airborne object 105. In the example of FIG. 1, the plurality of points or vectors 113 may correspond to a takeoff flight operation that may be associated with helicopters, multirotor manned or unmanned aerial vehicles, or other similar object types or classes, whereas airplanes, jets, gliders, fixed-wing aircraft or other object classes or types may not be physically capable of navigating along the plurality of points or vectors 113 of FIG. 1.

In additional example embodiments, in addition to position data, orientation data such as orientation, bearing, or heading data at each of the plurality of points or vectors 113 may also be detected, measured, or captured. The orientation data may be captured by an inertial navigation system, which may include accelerometers, gyroscopes, magnetometers, or other types of sensors onboard or associated with the airborne object 105. In addition, timestamp information may also be detected, stored, or captured in association with the orientation data at each of the plurality of points or vectors 113.

Based on the detected, measured, or captured position data, object type or class, orientation data, and/or timestamp information associated with the plurality of points or vectors 113, the actual trajectory 110 of the airborne object 105 in the environment may be determined. As further described herein, the actual trajectory 110 may then be transformed into one or more transformed trajectories and superimposed within imaging data of various different environments in order to generate training data for machine learning models or algorithms used for various computer vision applications.

Furthermore, as shown in FIG. 1, imaging data 102 may be captured by an aerial vehicle, e.g., an unmanned aerial vehicle, an autonomous aerial vehicle, a multirotor drone, or other type of aerial vehicle. The imaging data may be captured by imaging devices or sensors, analog or digital cameras, video cameras, or other types of imaging systems, devices, or sensors onboard or associated with the aerial vehicle. In some examples, the imaging data 102 may include portions of the environment around an airborne object 105 that is navigating within the environment, substantially as shown in FIG. 1. In other examples, the imaging data 102 may not include any airborne objects and may include only representations or portions of the environment.

During capture of the imaging data 102 of the environment, position data such as latitude, longitude, and altitude data of the aerial vehicle associated with individual frames of the imaging data 102 may be detected, measured, or captured. The position data may be captured by global positioning system (GPS) devices, local positioning system sensors, or other types of position detection systems, devices, or sensors onboard or associated with the aerial vehicle. In addition, timestamp information may also be detected, stored, or captured in association with the position data associated with individual frames of the imaging data 102.

In additional example embodiments, in addition to position data, orientation data such as orientation, bearing, or heading data of the aerial vehicle associated with individual frames of the imaging data 102 may also be detected, measured, or captured. The orientation data may be captured by an inertial navigation system, which may include accelerometers, gyroscopes, magnetometers, or other types of sensors onboard or associated with the aerial vehicle. In addition, timestamp information may also be detected, stored, or captured in association with the orientation data associated with individual frames of the imaging data 102.

As further described herein, the imaging data 102 may be used for later superimposition of various transformed trajectories based on one or more actual trajectories of airborne objects in various environments. Based on the detected, measured, or captured position data, orientation data, and/or timestamp information associated with imaging data 102 within an environment, one or more transformed trajectories may be superimposed or overlaid within the imaging data 102 to simulate flight or navigation of various types of airborne objects within the environment, thereby generating training data including airborne object trajectory data in various different environments to train machine learning models or algorithms used for various computer vision applications.

Figure 2:
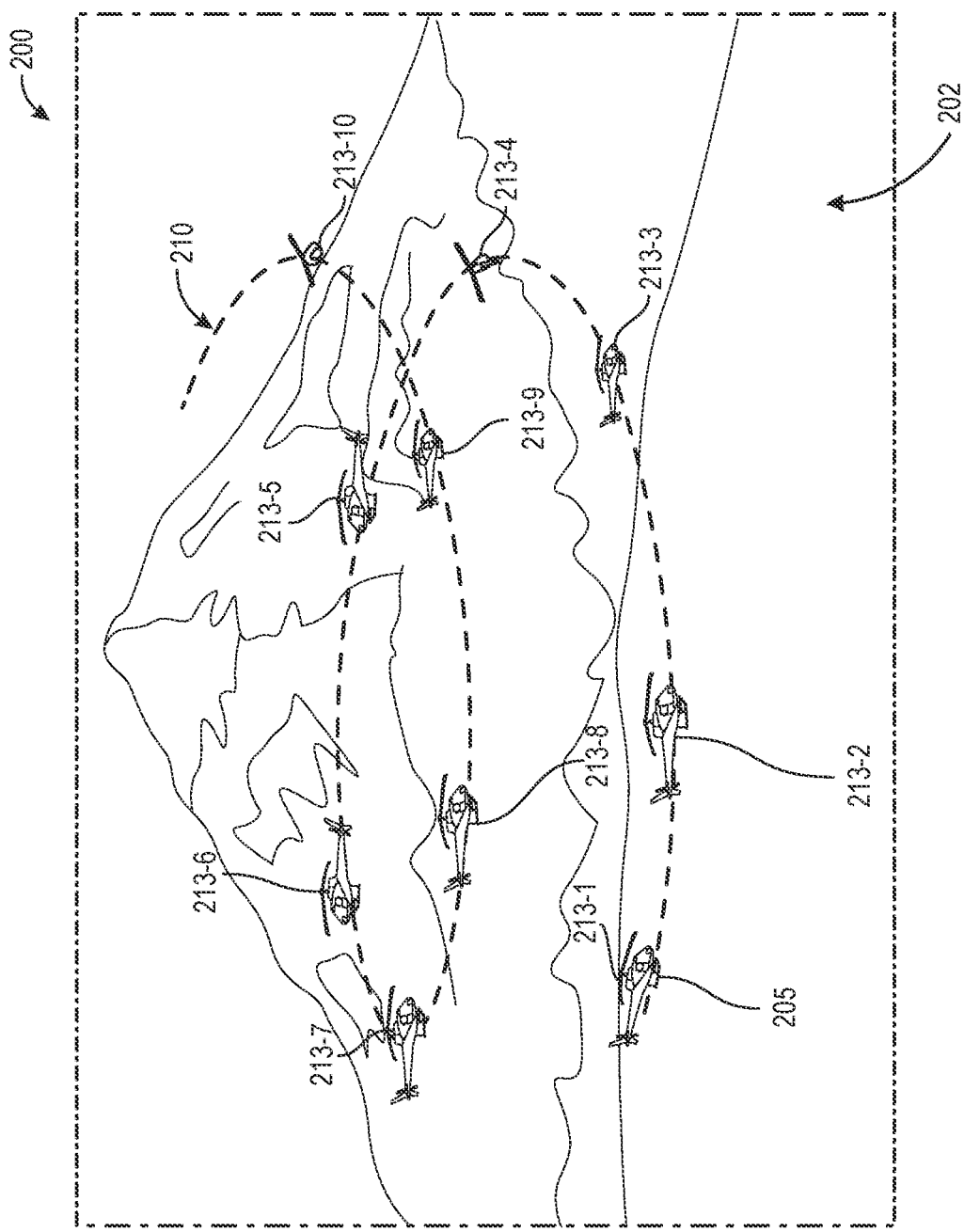
FIG. 2 is a schematic diagram of imaging data including an airborne object moving along a second trajectory, in accordance with implementations of the present disclosure.

FIG. 2 is a schematic diagram 200 of imaging data including an airborne object moving along a second trajectory, in accordance with implementations of the present disclosure.

In example embodiments, an airborne object 205 may be navigating within an environment. As shown in FIG. 2, the airborne object 205 may comprise a helicopter, but in other example embodiments, the airborne object may comprise other types of airborne objects, aerial vehicles, helicopters, airplanes, jets, gliders, multirotor aircraft, drones, birds, or others.

The airborne object 205 may move along an actual trajectory 210 that is illustrated by a dashed line in FIG. 2. The actual trajectory 210 may comprise a plurality of points or vectors 213 along which the airborne object 205 moves or navigates over time, e.g., a first point or vector 213-1 at a first timepoint, a second point or vector 213-2 at a second timepoint, a third point or vector 213-3 at a third timepoint, a fourth point or vector 213-4 at a fourth timepoint, a fifth point or vector 213-5 at a fifth timepoint, a sixth point or vector 213-6 at a sixth timepoint, a seventh point or vector 213-7 at a seventh timepoint, an eighth point or vector 213-8 at an eighth timepoint, a ninth point or vector 213-9 at a ninth timepoint, and a tenth point or vector 213-10 at a tenth timepoint.

During navigation of the airborne object 205 along the plurality of points or vectors 213, position data such as latitude, longitude, and altitude data at each of the plurality of points or vectors 213 may be detected, measured, or captured. The position data may be captured by global positioning system (GPS) devices, local positioning system sensors, or other types of position detection systems, devices, or sensors onboard or associated with the airborne object 205. In addition, timestamp information may also be detected, stored, or captured in association with the position data at each of the plurality of points or vectors 213.

In some example embodiments, in addition to position data, an object type or class associated with the airborne object 205 may also be detected, stored, or captured. For example, as shown in FIG. 2, the object type or class may indicate a helicopter or similar type of aerial vehicle as the type of airborne object 205. The object type or class may correspond with the plurality of points or vectors 213 during navigation of the airborne object 205. In the example of FIG. 2, the plurality of points or vectors 213 may correspond to a turning or banking flight operation that may be associated with helicopters, multirotor manned or unmanned aerial vehicles, or other similar object types or classes, whereas airplanes, jets, gliders, fixed-wing aircraft or other object classes or types may not be physically capable of navigating along the plurality of points or vectors 213 of FIG. 2.

In additional example embodiments, in addition to position data, orientation data such as orientation, bearing, or heading data at each of the plurality of points or vectors 213 may also be detected, measured, or captured. The orientation data may be captured by an inertial navigation system, which may include accelerometers, gyroscopes, magnetometers, or other types of sensors onboard or associated with the airborne object 205. In addition, timestamp information may also be detected, stored, or captured in association with the orientation data at each of the plurality of points or vectors 213.

Based on the detected, measured, or captured position data, object type or class, orientation data, and/or timestamp information associated with the plurality of points or vectors 213, the actual trajectory 210 of the airborne object 205 in the environment may be determined. As further described herein, the actual trajectory 210 may then be transformed into one or more transformed trajectories and superimposed within imaging data of various different environments in order to generate training data for machine learning models or algorithms used for various computer vision applications.

Furthermore, as shown in FIG. 2, imaging data 202 may be captured by an aerial vehicle, e.g., an unmanned aerial vehicle, an autonomous aerial vehicle, a multirotor drone, or other type of aerial vehicle. The imaging data may be captured by imaging devices or sensors, analog or digital cameras, video cameras, or other types of imaging systems, devices, or sensors onboard or associated with the aerial vehicle. In some examples, the imaging data 202 may include portions of the environment around an airborne object 205 that is navigating within the environment, substantially as shown in FIG. 2. In other examples, the imaging data 202 may not include any airborne objects and may include only representations or portions of the environment.

During capture of the imaging data 202 of the environment, position data such as latitude, longitude, and altitude data of the aerial vehicle associated with individual frames of the imaging data 202 may be detected, measured, or captured. The position data may be captured by global positioning system (GPS) devices, local positioning system sensors, or other types of position detection systems, devices, or sensors onboard or associated with the aerial vehicle. In addition, timestamp information may also be detected, stored, or captured in association with the position data associated with individual frames of the imaging data 202.

In additional example embodiments, in addition to position data, orientation data such as orientation, bearing, or heading data of the aerial vehicle associated with individual frames of the imaging data 202 may also be detected, measured, or captured. The orientation data may be captured by an inertial navigation system, which may include accelerometers, gyroscopes, magnetometers, or other types of sensors onboard or associated with the aerial vehicle. In addition, timestamp information may also be detected, stored, or captured in association with the orientation data associated with individual frames of the imaging data 202.

As further described herein, the imaging data 202 may be used for later superimposition of various transformed trajectories based on one or more actual trajectories of airborne objects in various environments. Based on the detected, measured, or captured position data, orientation data, and/or timestamp information associated with imaging data 202 within an environment, one or more transformed trajectories may be superimposed or overlaid within the imaging data 202 to simulate flight or navigation of various types of airborne objects within the environment, thereby generating training data including airborne object trajectory data in various different environments to train machine learning models or algorithms used for various computer vision applications.

Figure 3:
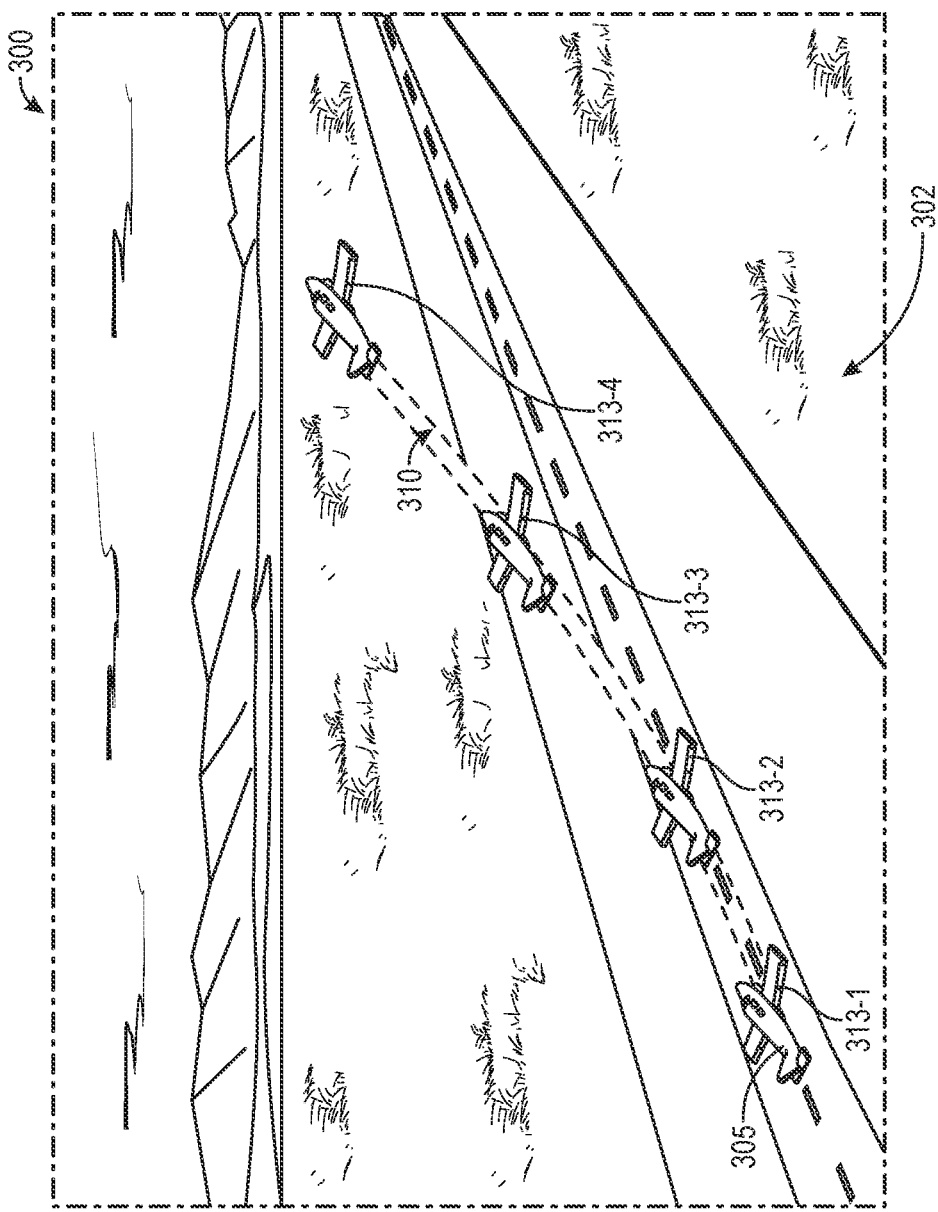
FIG. 3 is a schematic diagram of imaging data including an airborne object moving along a third trajectory, in accordance with implementations of the present disclosure.

FIG. 3 is a schematic diagram 300 of imaging data including an airborne object moving along a third trajectory, in accordance with implementations of the present disclosure.

In example embodiments, an airborne object 305 may be navigating within an environment. As shown in FIG. 3, the airborne object 305 may comprise a fixed-wing aircraft, but in other example embodiments, the airborne object may comprise other types of airborne objects, aerial vehicles, helicopters, airplanes, jets, gliders, multirotor aircraft, drones, birds, or others.

The airborne object 305 may move along an actual trajectory 310 that is illustrated by dashed lines in FIG. 3. The actual trajectory 310 may comprise a plurality of points or vectors 313 along which the airborne object 305 moves or navigates over time, e.g., a first point or vector 313-1 at a first timepoint, a second point or vector 313-2 at a second timepoint, a third point or vector 313-3 at a third timepoint, and a fourth point or vector 313-4 at a fourth timepoint.

During navigation of the airborne object 305 along the plurality of points or vectors 313, position data such as latitude, longitude, and altitude data at each of the plurality of points or vectors 313 may be detected, measured, or captured. The position data may be captured by global positioning system (GPS) devices, local positioning system sensors, or other types of position detection systems, devices, or sensors onboard or associated with the airborne object 305. In addition, timestamp information may also be detected, stored, or captured in association with the position data at each of the plurality of points or vectors 313.

In some example embodiments, in addition to position data, an object type or class associated with the airborne object 305 may also be detected, stored, or captured. For example, as shown in FIG. 3, the object type or class may indicate a fixed-wing aircraft or similar type of aerial vehicle as the type of airborne object 305. The object type or class may correspond with the plurality of points or vectors 313 during navigation of the airborne object 305. In the example of FIG. 3, the plurality of points or vectors 313 may correspond to a takeoff flight operation that may be associated with fixed-wing aircraft, airplanes, jets, gliders, or other similar object types or classes, whereas helicopters, multirotor manned or unmanned aerial vehicles, drones, or other object classes or types may not be physically capable of navigating along the plurality of points or vectors 313 of FIG. 3.

In additional example embodiments, in addition to position data, orientation data such as orientation, bearing, or heading data at each of the plurality of points or vectors 313 may also be detected, measured, or captured. The orientation data may be captured by an inertial navigation system, which may include accelerometers, gyroscopes, magnetometers, or other types of sensors onboard or associated with the airborne object 305. In addition, timestamp information may also be detected, stored, or captured in association with the orientation data at each of the plurality of points or vectors 313.

Based on the detected, measured, or captured position data, object type or class, orientation data, and/or timestamp information associated with the plurality of points or vectors 313, the actual trajectory 310 of the airborne object 305 in the environment may be determined. As further described herein, the actual trajectory 310 may then be transformed into one or more transformed trajectories and superimposed within imaging data of various different environments in order to generate training data for machine learning models or algorithms used for various computer vision applications.

Furthermore, as shown in FIG. 3, imaging data 302 may be captured by an aerial vehicle, e.g., an unmanned aerial vehicle, an autonomous aerial vehicle, a multirotor drone, or other type of aerial vehicle. The imaging data may be captured by imaging devices or sensors, analog or digital cameras, video cameras, or other types of imaging systems, devices, or sensors onboard or associated with the aerial vehicle. In some examples, the imaging data 302 may include portions of the environment around an airborne object 305 that is navigating within the environment, substantially as shown in FIG. 3. In other examples, the imaging data 302 may not include any airborne objects and may include only representations or portions of the environment.

During capture of the imaging data 302 of the environment, position data such as latitude, longitude, and altitude data of the aerial vehicle associated with individual frames of the imaging data 302 may be detected, measured, or captured. The position data may be captured by global positioning system (GPS) devices, local positioning system sensors, or other types of position detection systems, devices, or sensors onboard or associated with the aerial vehicle. In addition, timestamp information may also be detected, stored, or captured in association with the position data associated with individual frames of the imaging data 302.

In additional example embodiments, in addition to position data, orientation data such as orientation, bearing, or heading data of the aerial vehicle associated with individual frames of the imaging data 302 may also be detected, measured, or captured. The orientation data may be captured by an inertial navigation system, which may include accelerometers, gyroscopes, magnetometers, or other types of sensors onboard or associated with the aerial vehicle. In addition, timestamp information may also be detected, stored, or captured in association with the orientation data associated with individual frames of the imaging data 302.

As further described herein, the imaging data 302 may be used for later superimposition of various transformed trajectories based on one or more actual trajectories of airborne objects in various environments. Based on the detected, measured, or captured position data, orientation data, and/or timestamp information associated with imaging data 302 within an environment, one or more transformed trajectories may be superimposed or overlaid within the imaging data 302 to simulate flight or navigation of various types of airborne objects within the environment, thereby generating training data including airborne object trajectory data in various different environments to train machine learning models or algorithms used for various computer vision applications.

Figure 4:
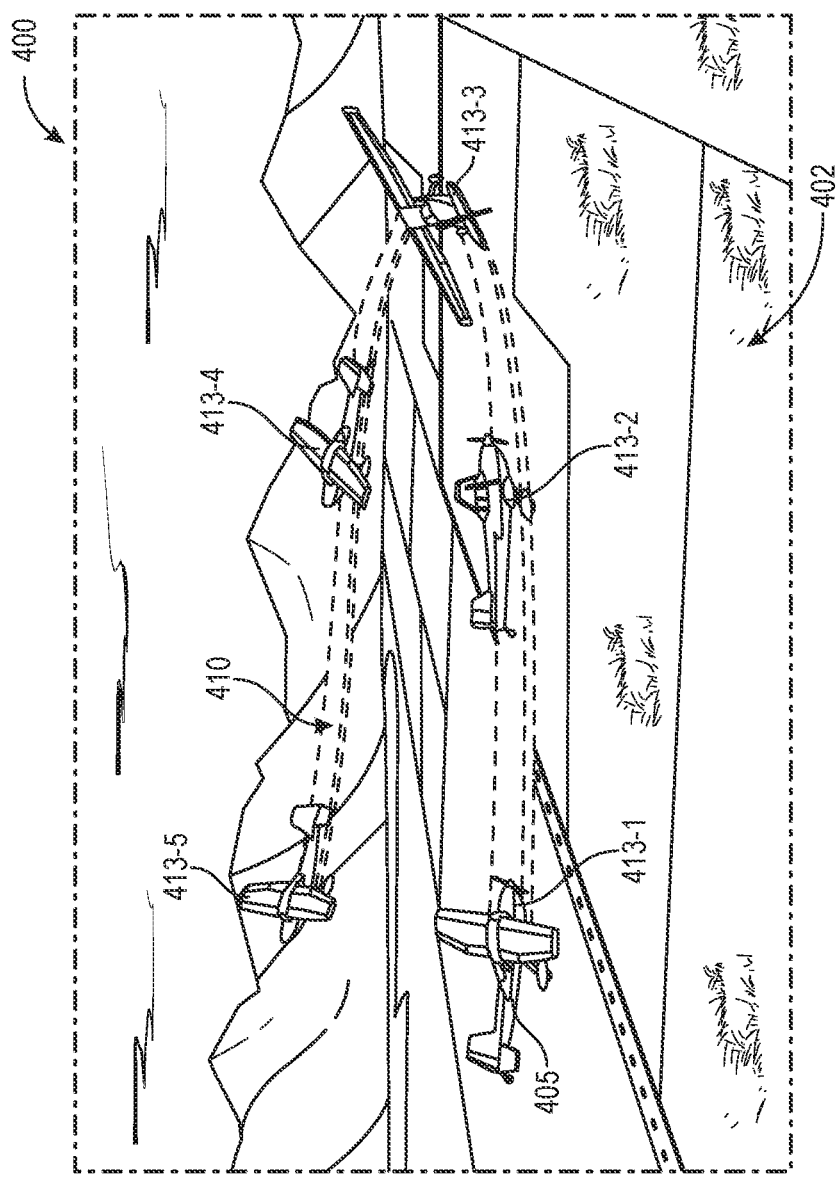
FIG. 4 is a schematic diagram of imaging data including an airborne object moving along a fourth trajectory, in accordance with implementations of the present disclosure.

FIG. 4 is a schematic diagram 400 of imaging data including an airborne object moving along a fourth trajectory, in accordance with implementations of the present disclosure.

In example embodiments, an airborne object 405 may be navigating within an environment. As shown in FIG. 4, the airborne object 405 may comprise a fixed-wing aircraft, but in other example embodiments, the airborne object may comprise other types of airborne objects, aerial vehicles, helicopters, airplanes, jets, gliders, multirotor aircraft, drones, birds, or others.

The airborne object 405 may move along an actual trajectory 410 that is illustrated by dashed lines in FIG. 4. The actual trajectory 410 may comprise a plurality of points or vectors 413 along which the airborne object 405 moves or navigates over time, e.g., a first point or vector 413-1 at a first timepoint, a second point or vector 413-2 at a second timepoint, a third point or vector 413-3 at a third timepoint, a fourth point or vector 413-4 at a fourth timepoint, and a fifth point or vector 413-5 at a fifth timepoint.

During navigation of the airborne object 405 along the plurality of points or vectors 413, position data such as latitude, longitude, and altitude data at each of the plurality of points or vectors 413 may be detected, measured, or captured. The position data may be captured by global positioning system (GPS) devices, local positioning system sensors, or other types of position detection systems, devices, or sensors onboard or associated with the airborne object 405. In addition, timestamp information may also be detected, stored, or captured in association with the position data at each of the plurality of points or vectors 413.

In some example embodiments, in addition to position data, an object type or class associated with the airborne object 405 may also be detected, stored, or captured. For example, as shown in FIG. 4, the object type or class may indicate a fixed-wing aircraft or similar type of aerial vehicle as the type of airborne object 405. The object type or class may correspond with the plurality of points or vectors 413 during navigation of the airborne object 405. In the example of FIG. 4, the plurality of points or vectors 413 may correspond to a turning or banking flight operation that may be associated with fixed-wing aircraft, airplanes, jets, gliders, or other similar object types or classes, whereas helicopters, multirotor manned or unmanned aerial vehicles, drones, or other object classes or types may not be physically capable of navigating along the plurality of points or vectors 413 of FIG. 4.

In additional example embodiments, in addition to position data, orientation data such as orientation, bearing, or heading data at each of the plurality of points or vectors 413 may also be detected, measured, or captured. The orientation data may be captured by an inertial navigation system, which may include accelerometers, gyroscopes, magnetometers, or other types of sensors onboard or associated with the airborne object 405. In addition, timestamp information may also be detected, stored, or captured in association with the orientation data at each of the plurality of points or vectors 413.

Based on the detected, measured, or captured position data, object type or class, orientation data, and/or timestamp information associated with the plurality of points or vectors 413, the actual trajectory 410 of the airborne object 405 in the environment may be determined. As further described herein, the actual trajectory 410 may then be transformed into one or more transformed trajectories and superimposed within imaging data of various different environments in order to generate training data for machine learning models or algorithms used for various computer vision applications.

Furthermore, as shown in FIG. 4, imaging data 402 may be captured by an aerial vehicle, e.g., an unmanned aerial vehicle, an autonomous aerial vehicle, a multirotor drone, or other type of aerial vehicle. The imaging data may be captured by imaging devices or sensors, analog or digital cameras, video cameras, or other types of imaging systems, devices, or sensors onboard or associated with the aerial vehicle. In some examples, the imaging data 402 may include portions of the environment around an airborne object 405 that is navigating within the environment, substantially as shown in FIG. 4. In other examples, the imaging data 402 may not include any airborne objects and may include only representations or portions of the environment.

During capture of the imaging data 402 of the environment, position data such as latitude, longitude, and altitude data of the aerial vehicle associated with individual frames of the imaging data 402 may be detected, measured, or captured. The position data may be captured by global positioning system (GPS) devices, local positioning system sensors, or other types of position detection systems, devices, or sensors onboard or associated with the aerial vehicle. In addition, timestamp information may also be detected, stored, or captured in association with the position data associated with individual frames of the imaging data 402.

In additional example embodiments, in addition to position data, orientation data such as orientation, bearing, or heading data of the aerial vehicle associated with individual frames of the imaging data 402 may also be detected, measured, or captured. The orientation data may be captured by an inertial navigation system, which may include accelerometers, gyroscopes, magnetometers, or other types of sensors onboard or associated with the aerial vehicle. In addition, timestamp information may also be detected, stored, or captured in association with the orientation data associated with individual frames of the imaging data 402.

As further described herein, the imaging data 402 may be used for later superimposition of various transformed trajectories based on one or more actual trajectories of airborne objects in various environments. Based on the detected, measured, or captured position data, orientation data, and/or timestamp information associated with imaging data 402 within an environment, one or more transformed trajectories may be superimposed or overlaid within the imaging data 402 to simulate flight or navigation of various types of airborne objects within the environment, thereby generating training data including airborne object trajectory data in various different environments to train machine learning models or algorithms used for various computer vision applications.

Figure 5:
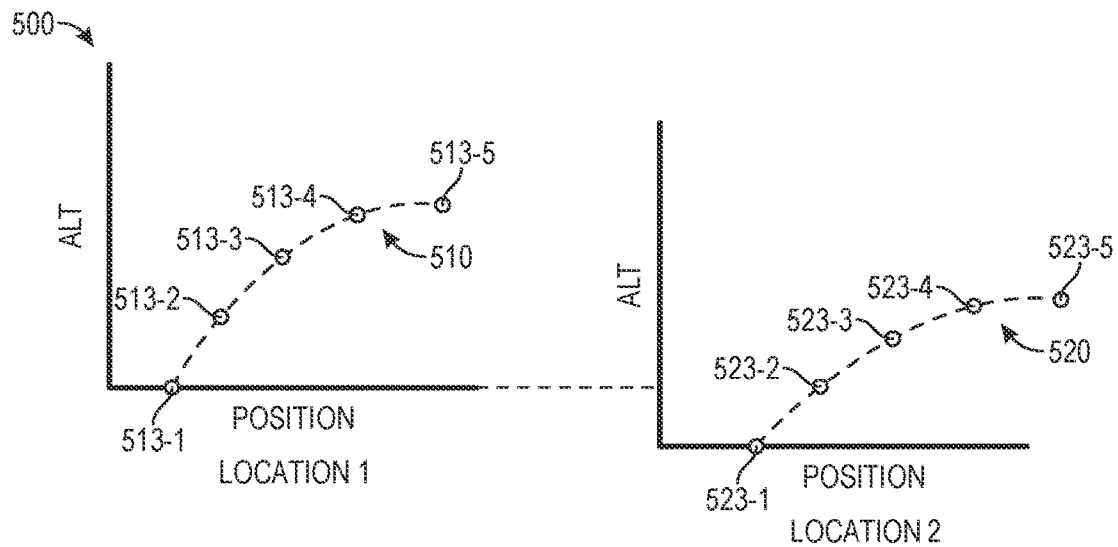
FIG. 5 is a schematic diagram of a portion of an example transformation of an airborne object trajectory, in accordance with implementations of the present disclosure.

FIG. 5 is a schematic diagram 500 of a portion of an example transformation of an airborne object trajectory, in accordance with implementations of the present disclosure. Although FIG. 5 illustrates two-dimensional graphs for simplicity of description, it is understood that the position and/or orientation data may comprise data in three-dimensional space.

As shown in FIG. 5, the left side graph indicating position and altitude data within an environment, e.g., at Location 1, may comprise an actual trajectory 510 of an airborne object over time, e.g., as detected or measured by one or more position detection devices or sensors onboard or associated with the airborne object. The example actual trajectory 510 of the airborne object illustrated in FIG. 5 may comprise a particular type of flight or navigation maneuver, e.g., a takeoff operation of the airborne object. In the example of FIG. 5, the actual trajectory 510 may comprise a plurality of points or vectors 513-1, 513-2, 513-3, 513-4, 513-5 associated with a corresponding plurality of timepoints.

In example embodiments, the position data at each of the plurality of points or vectors 513 of the actual trajectory 510 may comprise latitude and longitude data of the airborne object at Location 1. In addition, the altitude data at each of the plurality of points or vectors 513 of the actual trajectory 510 may comprise altitude or elevation data of the airborne object at Location 1. In some examples, the position and altitude data may be received from the airborne object as a GPX (GPS Exchange Format) file, although in other examples, various other file or data types may be used to transmit and/or receive various data from the airborne object. Further, timestamp information may be associated with the latitude, longitude, and altitude data at each of the plurality of points or vectors 513 of the actual trajectory 510. As further described herein, various other data, such as orientation, bearing, heading, or other data, may also be associated with each of the plurality of points or vectors 513 of the actual trajectory 510.

In order to transform the example actual trajectory 510, e.g., real trajectory, to a transformed trajectory, e.g., synthetic trajectory, within a different environment, an altitude or elevation of the actual trajectory 510 may need to be modified or adjusted. Because an adjusted ground level (AGL) within an environment at Location 1 may differ from an adjusted ground level (AGL) within an environment at Location 2, the altitude or elevation of the actual trajectory 510 may need to be modified in order to generate a partially transformed trajectory 520 within the environment at Location 2. In some examples, AGL data for various locations may be determined with reference to SRTM (Shuttle Radar Topography Mission) GeoTIFF (Geographic Tagged Image File Format) images that provide altitude or elevation data associated with known positions, e.g., known latitude and longitude, although in other examples, various other file or data types may be used to determine AGL data for various locations. Such modification to altitude or elevation may ensure that the transformed trajectory 520 is at a same or substantially similar distance, altitude, or elevation relative to ground level at Location 2 as the actual trajectory 510 relative to ground level at Location 1. This may be particularly relevant in various flight or navigation maneuvers close to or contacting the ground, such as takeoff operations, landing operations, or other operations that are at least partially close to ground level.

In the example illustrated in FIG. 5, the right side graph indicating position and altitude data within an environment, e.g., at Location 2, may comprise a partially transformed trajectory 520 based on the actual trajectory 510 of the airborne object. The example partially transformed trajectory 520 may include altitude or elevation data that has been adjusted or modified based on an elevation difference between an AGL at Location 1 and an AGL at Location 2. As illustrated in FIG. 5, because the AGL at Location 2 is at a lower altitude or elevation than the AGL at Location 1, the partially transformed trajectory 520 may be adjusted or modified to have correspondingly lower altitude or elevation data compared to the actual trajectory 510. In addition, the partially transformed trajectory 520 may also comprise a plurality of points or vectors 523-1, 523-2, 523-3, 523-4, 523-5 including adjusted or modified altitude or elevation data based on the elevation difference between the AGL at Location 1 and the AGL at Location 2, and otherwise including position data, e.g., latitude, longitude, or other data, that substantially corresponds to the plurality of points or vectors 513-1, 513-2, 513-3, 513-4, 513-5 of the actual trajectory 510 over time.

Figure 6:
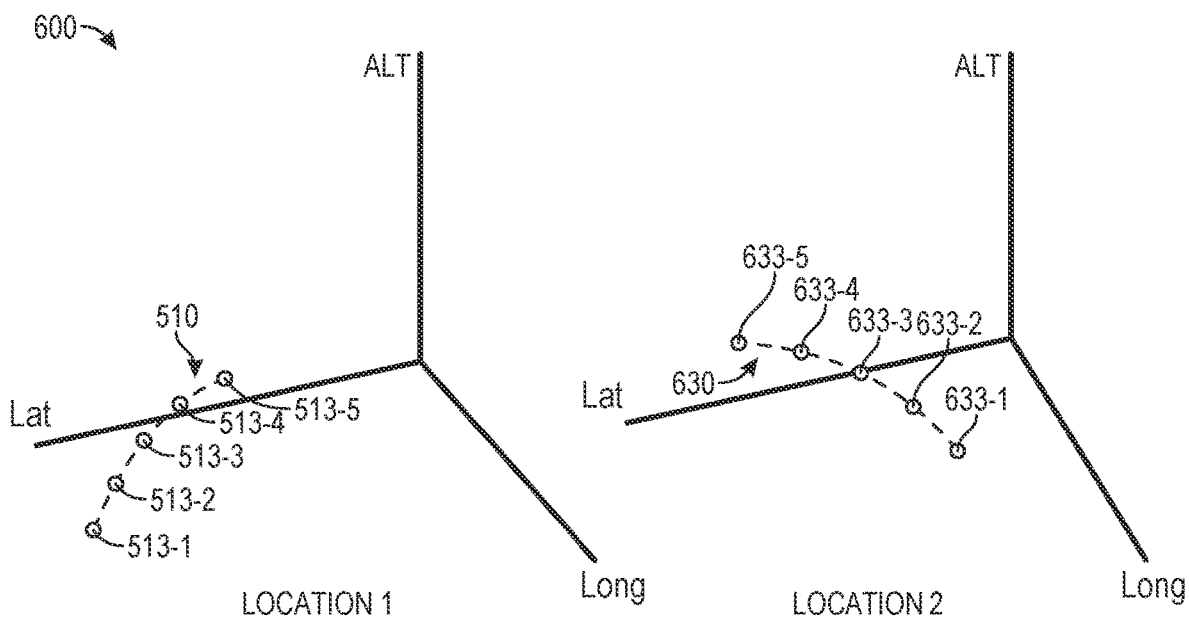
FIG. 6 is a schematic diagram of another portion of an example transformation of an airborne object trajectory, in accordance with implementations of the present disclosure.

FIG. 6 is a schematic diagram 600 of another portion of an example transformation of an airborne object trajectory, in accordance with implementations of the present disclosure.

After or in combination with adjusting or modifying the altitude or elevation data of an actual trajectory 510 at Location 1 to generate a partially transformed trajectory 520 at Location 2, as described herein, the position and/or orientation data of the actual trajectory 510, e.g., real trajectory, may be transformed to generate a fully transformed trajectory 630, e.g., synthetic trajectory, at Location 2. The actual trajectory 510 may comprise position and/or orientation data associated with each of the plurality of points or vectors 513 over time of the airborne object at Location 1, as illustrated in the left graph of FIG. 6.

In order to transform the position and/or orientation data of the actual trajectory 510 to a fully transformed trajectory 630 at Location 2, a point or vector may be selected within the environment at Location 2. For example, the selected point or vector may comprise a desired end point, or any other point or vector, associated with the fully transformed trajectory 630.

In some example embodiments, the point or vector may be selected from a plurality of points or vectors associated with or outside an exclusion volume around a position of an aerial vehicle that captured imaging data of the environment at Location 2. As described herein, imaging data may be captured by an imaging device onboard an aerial vehicle at Location 2, and position data of the aerial vehicle may be detected or measured that corresponds to individual frames of the imaging data. For individual frames of the imaging data, an exclusion volume may be defined around the position of the aerial vehicle within the environment at Location 2, e.g., a defined radius around the aerial vehicle, and/or a defined vertical distance above and/or below the aerial vehicle. In some examples, the exclusion volume may comprise a substantially cylindrical volume centered on a position of the aerial vehicle, e.g., a cylinder with a radius of 50 m and a height of 25 m, or various other combinations of radii, heights, or other distances. Generally, points or vectors that contact or are within the exclusion volume may be considered as potential encounter, collision, or near-collision scenarios, whereas points or vectors that are outside the exclusion volume may be considered as safe or collision-free scenarios. Further, the point or vector may be selected randomly, or systematically, from a plurality of points or vectors in contact with, within, or outside an exclusion volume.

In example embodiments, the selected point or vector may comprise a desired end point 633-5 of the fully transformed trajectory 630, which may also be a point or vector that contacts or is within an exclusion volume of an aerial vehicle, e.g., indicating a potential encounter or near-collision scenario. Based on the selected end point or vector 633-5 of the fully transformed trajectory 630, and further based on a corresponding end point or vector 513-5 of the actual trajectory 510, a rotation matrix may be determined that transforms the end point or vector 513-5 of the actual trajectory 510 to the selected end point or vector 633-5 of the fully transformed trajectory 630. In some examples, the rotation matrix may comprise values, factors, coefficients, figures, or other amounts and/or associated operations to transform position and/or orientation data of the end point or vector 513-5 of the actual trajectory 510 to the selected position and/or orientation data of the selected end point or vector 633-5 of the fully transformed trajectory 630.

For example, the rotation matrix may comprise values, amounts, and/or associated operations to transform latitude data of the end point or vector 513-5 of the actual trajectory 510 to the selected latitude data of the selected end point or vector 633-5 of the fully transformed trajectory 630. In addition, the rotation matrix may comprise values, amounts, and/or associated operations to transform longitude data of the end point or vector 513-5 of the actual trajectory 510 to the selected longitude data of the selected end point or vector 633-5 of the fully transformed trajectory 630. Further, the rotation matrix may comprise values, amounts, and/or associated operations to transform orientation, bearing, or heading data of the end point or vector 513-5 of the actual trajectory 510 to the selected orientation, bearing, or heading data of the selected end point or vector 633-5 of the fully transformed trajectory 630. As illustrated in the example of FIG. 6, the end point or vector 513-5 of the actual trajectory 510 may be transformed to the selected end point or vector 633-5 of the fully transformed trajectory 630, and the rotation matrix may be determined based on the transformation of end point or vector 513-5 to the selected end point or vector 633-5.

In some example embodiments, the position and/or orientation data of the points or vectors of the actual trajectory, e.g., real trajectory, and the fully transformed trajectory, e.g., synthetic trajectory, may be expressed or defined relative to an ECEF (Earth-centered, Earth-fixed) coordinate frame. Generally, for an ECEF coordinate frame, the center of the Earth is the origin, the X-axis extends within a plane of the Equator and toward and away from the Prime Meridian and 180 degrees longitude, the Y-axis extends within the plane of the Equator and toward and away from 90 degrees West longitude and 90 degrees East longitude, and the Z-axis extends between the North and South Poles. In other example embodiments, the various axes of the ECEF coordinate frame may be defined differently. In further example embodiments, the position and/or orientation data of the points or vectors of the actual trajectory and the fully transformed trajectory may be expressed or defined relative to various other types of coordinate or reference frames.

For the plurality of points or vectors 513 of the actual trajectory 510, a delta or difference between each respective point or vector and the end point or vector 513-5 (or a different point or vector if the selected one is not the end point or vector) of the actual trajectory 510 may be determined. The respective delta or difference between each respective point or vector, i.e., each respective $i^{th}$ point or vector (513-1, 513-2, 513-3, 513-4) among the plurality of points or vectors of the actual trajectory 510, and the end point or vector 513-5 may comprise values, factors, coefficients, figures, or other amounts and/or associated operations to transform the position and/or orientation data of each respective $i^{th}$ point or vector to the position and/or orientation data of the end point or vector 513-5.

For example, the delta or difference may comprise values, amounts, and/or associated operations to transform latitude data of each respective $i^{th}$ point or vector of the actual trajectory 510 to the latitude data of the end point or vector 513-5 of the actual trajectory 510. In addition, the delta or difference may comprise values, amounts, and/or associated operations to transform longitude data of each respective $i^{th}$ point or vector of the actual trajectory 510 to the longitude data of the end point or vector 513-5 of the actual trajectory 510. Further, the delta or difference may comprise values, amounts, and/or associated operations to transform orientation, bearing, or heading data of each respective $i^{th}$ point or vector of the actual trajectory 510 to the orientation, bearing, or heading data of the end point or vector 513-5 of the actual trajectory 510.

In addition, for each of the plurality of points or vectors 513 of the actual trajectory 510, the respective delta or difference may be multiplied or combined with the rotation matrix described herein. The multiplication or combination of each respective delta or difference with the rotation matrix may generate a rotated or transformed delta or difference associated with each of the plurality of points or vectors 513 of the actual trajectory 510, which may subsequently be used to determine each of the corresponding plurality of points or vectors 633 of the fully transformed trajectory 630 relative to the selected end point or vector 633-5.

Then, each of the plurality of points or vectors 633 of the fully transformed trajectory 630 may be determined based on the selected end point or vector 633-5 and the respective rotated or transformed delta or difference that is associated with each respective $i^{th}$ point or vector 513 of the actual trajectory 510. For example, the respective rotated or transformed delta or difference associated with each respective $i^{th}$ point or vector 513 of the actual trajectory 510 may be subtracted from (or otherwise combined with or transformed based on) the selected end point or vector 633-5 in order to determine the corresponding plurality of points or vectors 633 of the fully transformed trajectory 630, as illustrated in the right graph of FIG. 6. As a result, the position and/or orientation data of each respective $i^{th}$ point or vector, e.g., 513-1, 513-2, 513-3, and 513-4, of the actual trajectory 510 over time may be transformed to the position and/or orientation data of each corresponding point or vector, e.g., 633-1, 633-2, 633-3, and 633-4, of the fully transformed trajectory 630 over time, in combination with adjustment or modification to the altitude or elevation data, as described herein at least with respect to FIG. 5.

Thus, the fully transformed trajectory 630 may include the selected end point or vector 633-5, as well as the plurality of corresponding points or vectors 633-1, 633-2, 633-3, and 633-4, having position and/or orientation data corresponding to the environment at Location 2 and based on the position and/or orientation data of the actual trajectory 510 within the environment at Location 1. As described herein, the altitude or elevation data of each of the plurality of points or vectors of the fully transformed trajectory 630 may be adjusted or modified based on an elevation difference between an AGL associated with the environment at Location 1 and an AGL associated with the environment at Location 2. In addition, the plurality of points or vectors 513 of the actual trajectory 510 within the environment at Location 1 may have been fully transformed to the corresponding plurality of points or vectors 633 of the fully transformed trajectory 630, which may include position and/or orientation data, such as latitude, longitude, orientation, bearing, heading, or other data. Further, the relative positions and/or orientations of the plurality of points or vectors 513 of the actual trajectory 510 with respect to each other may be preserved or maintained for the relative positions and/or orientations of the corresponding plurality of points or vectors 633 of the fully transformed trajectory 630. In this manner, a single actual trajectory detected within a first environment, e.g., real trajectory, may be transformed to generate one or more transformed trajectories within one or more second or additional environments, e.g., synthetic trajectories.

In order to then generate training data including transformed trajectory data in a particular environment to train machine learning models or algorithms used for various computer vision applications, the transformed trajectory data may be superimposed or overlaid onto or within imaging data of the environment for which the transformed trajectory data was generated. As described herein, the imaging data may be associated with various position and/or orientation data, such as latitude, longitude, and altitude data associated with an aerial vehicle during capture of the imaging data, and/or orientation, bearing, or heading data associated with the aerial vehicle during capture of the imaging data. Further, the imaging data may also include timestamp information associated with individual frames of the imaging data.

Based on the position, orientation, and/or timestamp data or information associated with frames of the imaging data, and further based on the position, orientation, and/or timestamp data or information associated with points or vectors of the transformed trajectory data, the transformed trajectory may be superimposed or overlaid onto or within individual frames of the imaging data of the environment. In some examples, the selected point or vector, e.g., a selected end point or vector, of the transformed trajectory relative to an exclusion volume around a position of the aerial vehicle that captured the imaging data may also comprise selected timestamp data or information, in addition to the position and/or orientation data described herein, and corresponding timestamp data or information for the corresponding plurality of points or vectors of the transformed trajectory may be determined with reference to the selected timestamp data associated with the selected point or vector. As a result, the transformed trajectory data may be superimposed or overlaid onto or within individual frames of the imaging data of the environment.

Then, based on an object type or class associated with the actual trajectory based upon which the transformed trajectory was generated, a type or class of airborne object to be rendered or represented along the transformed trajectory may be selected. For example, if the object type or class associated with the actual trajectory is a helicopter, similar types or classes of airborne objects, e.g., other helicopters, multirotor aircraft, drones, or others, may be selected for rendering along the transformed trajectory. Likewise, if the object type or class associated with the actual trajectory is a fixed-wing aircraft, similar types or classes of airborne objects, e.g., airplanes, jets, gliders, other fixed-wing aircraft, or others, may be selected for rendering along the transformed trajectory. By selecting the airborne object to be rendered or represented based on an object type or class associated with the actual trajectory, physically illogical or impossible renderings along a transformed trajectory may be avoided, such as rendering a fixed-wing aircraft along a takeoff or landing trajectory associated with a helicopter.

Based on the selected airborne object, renderings, representations, or images of the airborne object at the plurality of points or vectors of the transformed trajectory may be generated, and then superimposed or overlaid onto or within individual frames of the imaging data of the environment. The renderings of the selected airborne object may be generated at determined positions, orientations, or sizes along the transformed trajectory. For example, the renderings may be positioned based on position data of the points or vectors of the transformed trajectory, and may be oriented based on orientation data of the points or vectors of the transformed trajectory. In addition, the positions, orientations, or sizes may be determined based on relative positions and/or orientations, as well as distances or ranges, between an imaging device onboard the aerial vehicle that captured the imaging data of the environment, and individual points or vectors of the transformed trajectory within the imaging data of the environment.

In additional example embodiments, the renderings, representations, or images of the selected airborne object may be rendered with lighting, shadows, or other visual characteristics based on lighting, shadows, or other visual characteristics that may be present within the imaging data of the environment. In some examples, positions of one or more sources of light may be determined or estimated based on image processing of visual characteristics of objects, elements, or other portions within the imaging data of the environment. In other examples, based on position, orientation, and timestamp data or information associated with individual frames of the imaging data, a position of the Sun may be determined for various environments, such as outdoor environments, open-air environments, or at least partially outdoor environments. Then, based on the determined position of the Sun for individual frames of the imaging data, visual characteristics such as lighting and shadows may be rendered to correspond to expected visual appearance of the renderings of the selected airborne object.

Based on the determined positions, orientations, sizes, and/or visual characteristics for renderings of the selected airborne object within individual frames of the imaging data of the environment, the representations or images of the selected airborne object may be rendered or presented at the plurality of points or vectors of the transformed trajectory by superimposing or overlaying them onto or within individual frames of the imaging data of the environment. In example embodiments, the representations or images of the selected airborne object may be rendered using Renderman by Pixar, or various other types of image rendering applications, programs, or algorithms.

In this manner, training data comprising imaging data with various airborne objects that are superimposed or overlaid as moving or navigating along transformed trajectories over time within various environments may be substantially automatically generated. Then, various machine learning models or algorithms used for computer vision applications may be trained using the training data, e.g., to detect, identify, classify, and/or recognize airborne objects and associated encounter scenarios in various environments.

Figure 7:
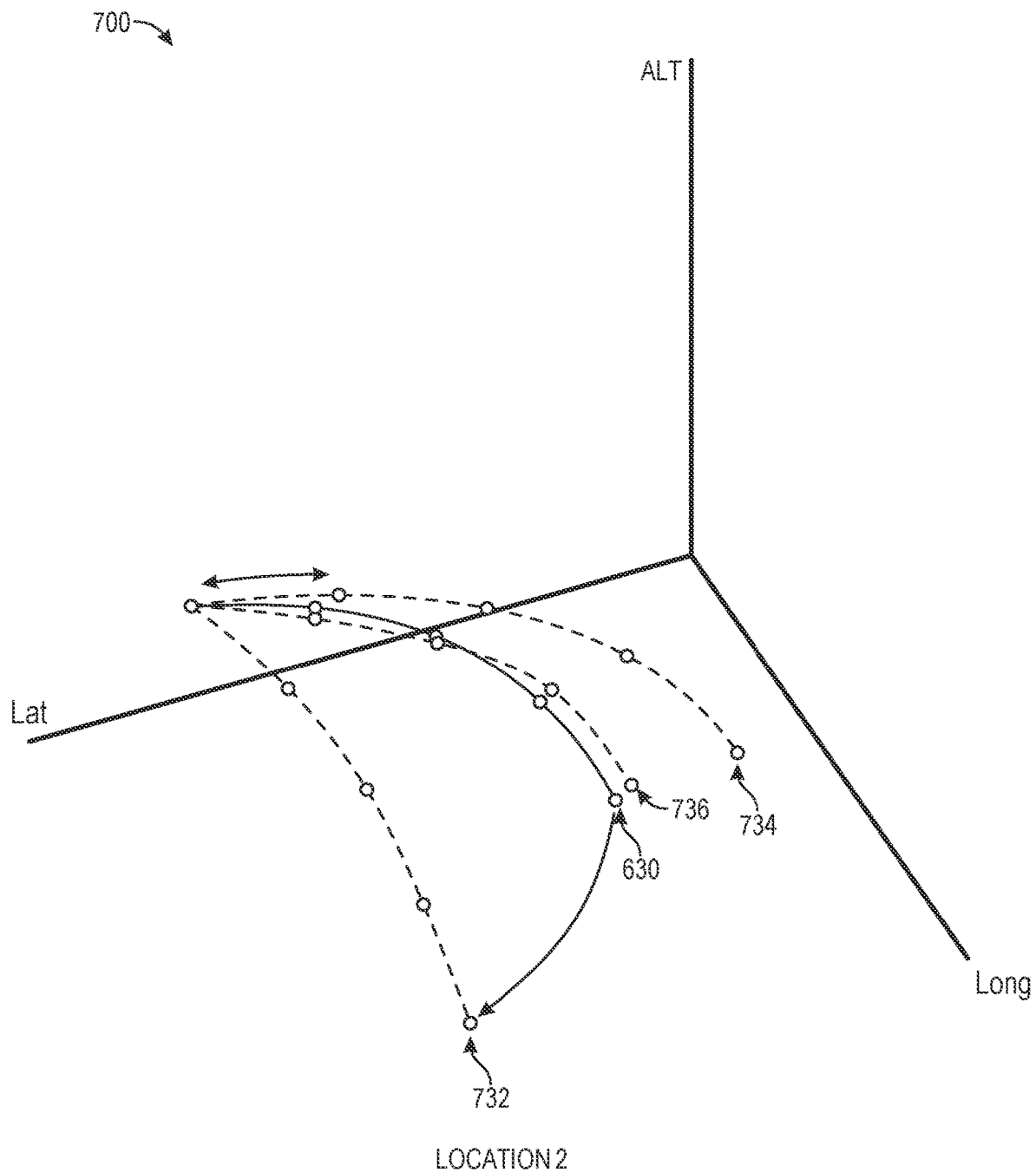
FIG. 7 is a schematic diagram of example modifications of an airborne object trajectory, in accordance with implementations of the present disclosure.

FIG. 7 is a schematic diagram 700 of example modifications of an airborne object trajectory, in accordance with implementations of the present disclosure.

As shown in FIG. 7, a fully transformed trajectory 630, e.g., synthetic trajectory, within an environment at Location 2 may be generated based on an actual trajectory, e.g., real trajectory, that is detected or measured within an environment at a different location, e.g., Location 1. As described herein, the fully transformed trajectory 630 may comprise a plurality of points or vectors along which the airborne object moves or navigates over time.

In some example embodiments, in addition to transforming an actual trajectory from a first environment to a fully transformed trajectory within a second environment, various aspects of the fully transformed trajectory may be modified to simulate various types of changes to the fully transformed trajectory, thereby generating additional training data that include airborne object trajectory data.

For example, the fully transformed trajectory 630, or one or more portions thereof, may be translated to different positions within an environment to simulate a change to a position of an airborne object. Although not shown in FIG. 7, the fully transformed trajectory 630 may be translated to a new or different position within the environment to generate an example modified trajectory. Various additional modified trajectories may be generated by translating the fully transformed trajectory 630 to various different positions within an environment.

Furthermore, the fully transformed trajectory 630, or one or more portions thereof, may be rotated about a vertical axis to simulate a change to an approach angle of an airborne object. As shown in FIG. 7, the fully transformed trajectory 630 may be rotated at an end point about a vertical axis to generate the example modified trajectory 732. Various additional modified trajectories may be generated by rotating the fully transformed trajectory 630 around a vertical axis by different angles or amounts, and/or by rotating the fully transformed trajectory 630 around vertical axes at various other positions relative to the points or vectors of the fully transformed trajectory 630.

In addition, the fully transformed trajectory 630, or one or more portions thereof, may be rotated relative to a horizontal plane to simulate changes to roll and/or pitch of an airborne object. Although not shown in FIG. 7, the fully transformed trajectory 630 may be rotated at a point or vector about a generally horizontal axis to generate an example modified trajectory. Various additional modified trajectories may be generated by rotating the fully transformed trajectory 630 around a generally horizontal axis by different angles or amounts, and/or by rotating the fully transformed trajectory 630 around generally horizontal axes at various other positions relative to the points or vectors of the fully transformed trajectory 630.

Further, the fully transformed trajectory 630, or one or more portions thereof, may be scaled to simulate different speeds, velocities, turning radii, or other aspects of flight or navigation of the airborne object. In this respect, the scaling of one or more portions of the fully transformed trajectory 630 may comprise stretching, expanding, shrinking, or contracting one or more portions to simulate changes to speeds, velocities, turning radii, or other aspects of flight or navigation of the airborne object. As shown in FIG. 7, the fully transformed trajectory 630 may be stretched at one or more portions to simulate greater speed or velocity of the airborne object and generate the example modified trajectory 734. Various additional modified trajectories may be generated by scaling the fully transformed trajectory 630 by different amounts or factors, and/or by scaling one or more portions of the fully transformed trajectory 630 by the same or different amounts or factors to further simulate changes to speeds, velocities, turning radii, or other aspects of flight or navigation of the airborne object.

Moreover, the fully transformed trajectory 630, or one or more portions thereof, may be biased or randomized to simulate external conditions such as wind, crosswinds, turbulence, other external conditions, or measurement errors or noise related to flight or navigation of the airborne object. In this respect, the one or more portions of the fully transformed trajectory 630 may be consistently or systematically biased in a particular direction to simulate effective wind from the particular direction that affects flight or navigation of the airborne object. Alternatively, the one or more portions of the fully transformed trajectory 630 may be randomly biased or shifted in different directions to simulate crosswinds, turbulence, other external conditions, or measurement errors or noise that affect flight or navigation of the airborne object. As shown in FIG. 7, the one or more portions of the fully transformed trajectory 630 may be randomly biased or shifted in different directions to simulate various external conditions and/or measurement errors or noise and generate the example modified trajectory 736. Various additional modified trajectories may be generated by applying different types, directions, levels, or amounts of bias or shifts to one or more portions of the fully transformed trajectory 630 that may cause adjustment or movement of at least some of the plurality of points or vectors of the fully transformed trajectory 630.

Various types of modifications, and/or combinations thereof, may be applied to a fully transformed trajectory within an environment that is generated based on an actual trajectory that is detected or measured within a different environment. In some example embodiments, the various modifications to transformed trajectories within an environment may be generated using 3DS Max (3D Studio Max) by Autodesk, Maya by Autodesk, Blender (an open-source application), or various other types of point, vector, and/or trajectory modification applications, programs, or algorithms. By applying various types of modifications to transformed trajectories within different environments, additional types and variations of training data including airborne object trajectory data may be generated. As described herein, representations or images of various airborne objects may be superimposed or overlaid along the modified and transformed trajectories within various environments to substantially automatically generate the training data. Then, various machine learning models or algorithms used for computer vision applications may be trained using the training data, e.g., to detect, identify, classify, and/or recognize airborne objects and associated encounter scenarios in various environments.

Figure 8:
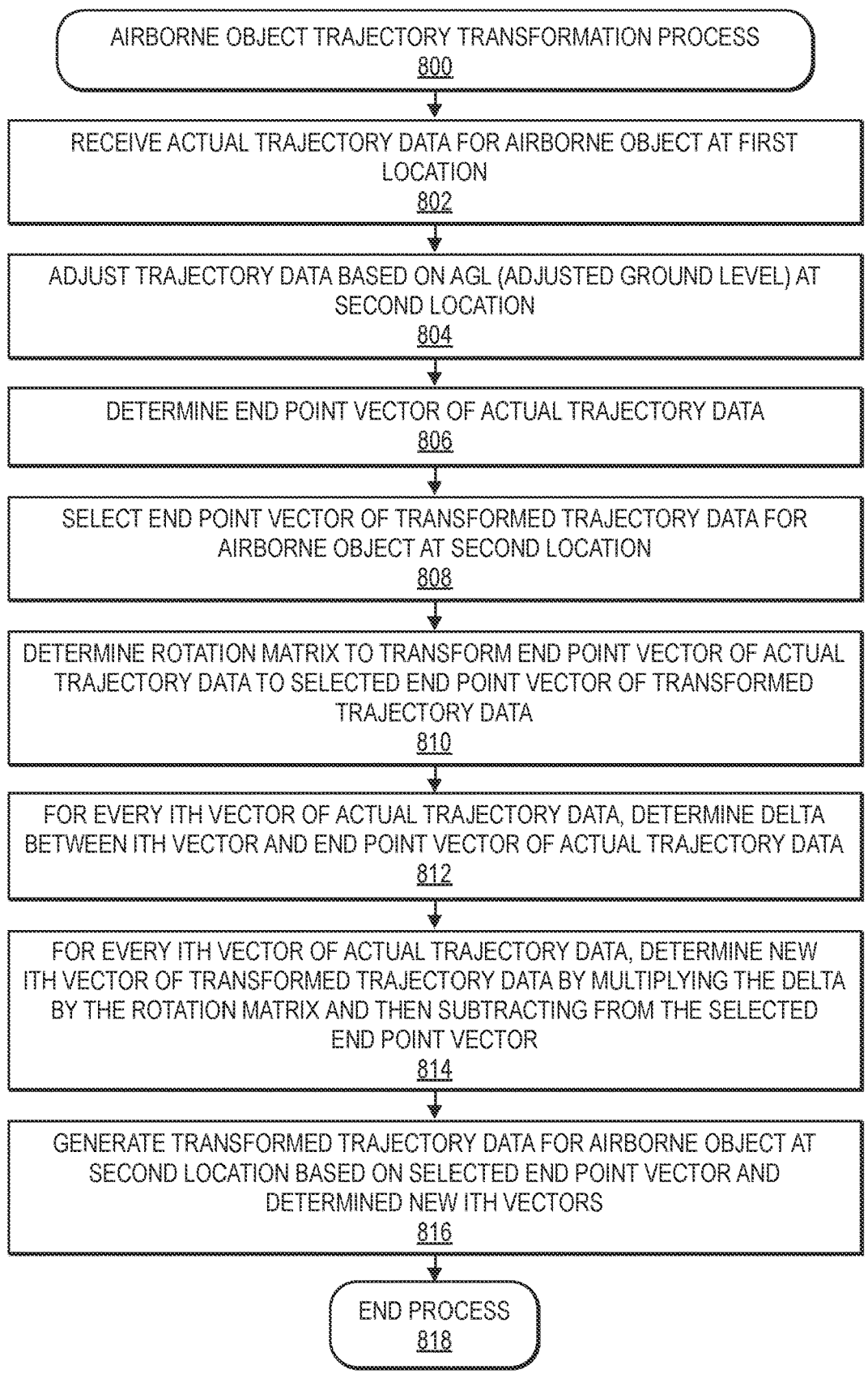
FIG. 8 is a flow diagram illustrating an example airborne object trajectory transformation process, in accordance with implementations of the present disclosure.

FIG. 8 is a flow diagram illustrating an example airborne object trajectory transformation process 800, in accordance with implementations of the present disclosure.

The process 800 may begin by receiving actual trajectory data for an airborne object at a first location, as at 802. For example, the actual trajectory data may comprise a plurality of points or vectors associated with a flight or navigation of an airborne object over time. The actual trajectory data may comprise position, orientation, and/or timestamp data or information. In addition, the position data may be detected or measured by various position detection devices or sensors onboard the airborne object, and the orientation data may be detected or measured by various inertial navigation units, sensors, or components onboard the airborne object. The actual trajectory data may also be associated with a particular object type or class, and the actual trajectory data may be captured within a particular environment. Further, a control system may receive actual trajectory data from one or more sensors onboard or associated with an airborne object that moves or navigates along the actual trajectory.

The process 800 may continue by adjusting the actual trajectory data based on AGL (adjusted ground level) at a second location, as at 804. For example, an environment associated with the first location at which the actual trajectory data was detected or measured may have an associated first AGL. An environment associated with a second location for which a transformed trajectory may be generated may have an associated second AGL. Based on an elevation difference between the first AGL at the first location and the second AGL at the second location, altitude or elevation data of the actual trajectory data may be adjusted or modified to maintain substantially the same distance or range above ground for a transformed trajectory at the second location as the distance or range above ground for the actual trajectory at the first location. Further, a control system may adjust the actual trajectory data based on an elevation difference between a first location and a second location.

The process 800 may proceed by determining an end point vector of the actual trajectory data, as at 806. For example, a point or vector along the actual trajectory data may be determined, and the point or vector may comprise an end point or vector or any other point or vector of the actual trajectory. In the examples described herein, the determined point or vector comprises an end point or vector of the actual trajectory data. Further, a control system may determine an end point or vector of the actual trajectory data.

The process 800 may continue to select an end point vector of a transformed trajectory data for the airborne object at the second location, as at 808. For example, a point or vector for the transformed trajectory data may be selected, and the selected point or vector may comprise an end point or vector or any other point or vector of the transformed trajectory that may correspond to the determined point or vector of the actual trajectory data, as determined in step 806. In the examples described herein, the selected point or vector comprises a selected end point or vector of the transformed trajectory data. In addition, the selected end point or vector may be selected randomly or systematically from a plurality of points or vectors relative to an exclusion volume around a position of an aerial vehicle that captured imaging data at the second location over or within which the transformed trajectory data may ultimately be superimposed or overlaid. The subset of the plurality of points or vectors that contact or lie within the exclusion volume may comprise encounter, collision, or near-collision scenarios between the aerial vehicle and the airborne object moving along the transformed trajectory, whereas the subset of the plurality of points or vectors that lie outside the exclusion volume may comprise safe or collision-free scenarios between the aerial vehicle and the airborne object moving along the transformed trajectory. Further, a control system may select an end point or vector of the transformed trajectory data for the airborne object at the second location.

The process 800 may then proceed to determine a rotation matrix to transform the end point vector of the actual trajectory data to the selected end point vector of the transformed trajectory data, as at 810. For example, the rotation matrix may comprise values, factors, coefficients, figures, or other amounts and/or associated operations to transform position and/or orientation data of the end point or vector of the actual trajectory data to the selected position and/or orientation data of the selected end point or vector of the transformed trajectory data. The latitude data of the end point or vector of the actual trajectory data may be transformed according to the rotation matrix to substantially match or correspond to the latitude data of the selected end point or vector of the transformed trajectory data, the longitude data of the end point or vector of the actual trajectory data may be transformed according to the rotation matrix to substantially match or correspond to the longitude data of the selected end point or vector of the transformed trajectory data, and/or the orientation, bearing, or heading data of the end point or vector of the actual trajectory data may be transformed according to the rotation matrix to substantially match or correspond to the orientation, bearing, or heading data of the selected end point or vector of the transformed trajectory data. Further, a control system may determine the rotation matrix to transform the end point or vector of the actual trajectory to the selected end point or vector of the transformed trajectory.

The process 800 may continue with, for every $i^{th}$ vector of the actual trajectory data, determining a delta between each respective $i^{th}$ vector and an end point vector of the actual trajectory data, as at 812. For example, for each respective point or vector, i.e., each $i^{th}$ vector, of the plurality of points or vectors of the actual trajectory data, a respective delta or difference between the $i^{th}$ point or vector and the end point or vector may be determined. The respective delta or difference may comprise values, factors, coefficients, figures, or other amounts and/or associated operations to transform position and/or orientation data of a respective $i^{th}$ vector of the actual trajectory data to the position and/or orientation data of the end point or vector of the actual trajectory data. Further, a control system may determine, for each respective $i^{th}$ vector of the actual trajectory data, a respective delta or difference between each $i^{th}$ vector and the end point or vector of the actual trajectory data.

The process 800 may then proceed with, for every $i^{th}$ vector of the actual trajectory data, determining a new $i^{th}$ vector of the transformed trajectory data by multiplying the respective delta by the rotation matrix and then subtracting the rotated delta from the selected end point vector of the transformed trajectory data, as at 814. For example, for each respective point or vector, i.e., each $i^{th}$ vector, of the plurality of points or vectors of the actual trajectory data, the determined respective delta or difference may be multiplied by, or otherwise combined with, the rotation matrix as determined herein at step 810. In this manner, the respective delta for each $i^{th}$ vector of the actual trajectory data may be rotated and/or transformed to generate a respective rotated delta for each corresponding point or vector of the transformed trajectory data. Then, the respective rotated delta may be subtracted from, or otherwise combined with or transformed based on, the selected end point or vector of the transformed trajectory data. In this manner, the plurality of points or vectors of the transformed trajectory data within the second environment may be determined that correspond to the plurality of points or vectors of the actual trajectory data within the first environment. Further, a control system may determine, for each respective $i^{th}$ vector of the actual trajectory data, a respective new $i^{th}$ vector of the transformed trajectory data based on a respective delta and the rotation matrix.

The process 800 may then continue by generating transformed trajectory data for an airborne object at the second location based on the selected end point vector and the determined new $i^{th}$ vectors, as at 816. For example, the adjustment or modification of altitude or elevation data based on an elevation difference between the first and second locations as described herein at step 804, the selected end point or vector of the transformed trajectory data as described herein at step 808, and the determined new $i^{th}$ vectors of the transformed trajectory data as described herein at step 814 may then be combined to generate the fully transformed trajectory data. The transformed trajectory data may include translations, rotations, or other adjustments or modifications to portions of the latitude, longitude, altitude, orientation, bearing, heading, or other data of the plurality of points or vectors of the actual trajectory data. Generally, the plurality of points or vectors of the transformed trajectory data, e.g., synthetic trajectory, may substantially preserve or maintain the relative positions and/or orientations among the plurality of points or vectors of the actual trajectory data, e.g., real trajectory data, thereby conceptually duplicating and reproducing with appropriate transformations the actual trajectory data as the transformed trajectory data within a different environment. Further, a control system may generate the transformed trajectory data for an airborne object at the second location based on the selected end point or vector and the determined new $i^{th}$ vectors.

The process 800 may then end, as at 818.

Figure 9:
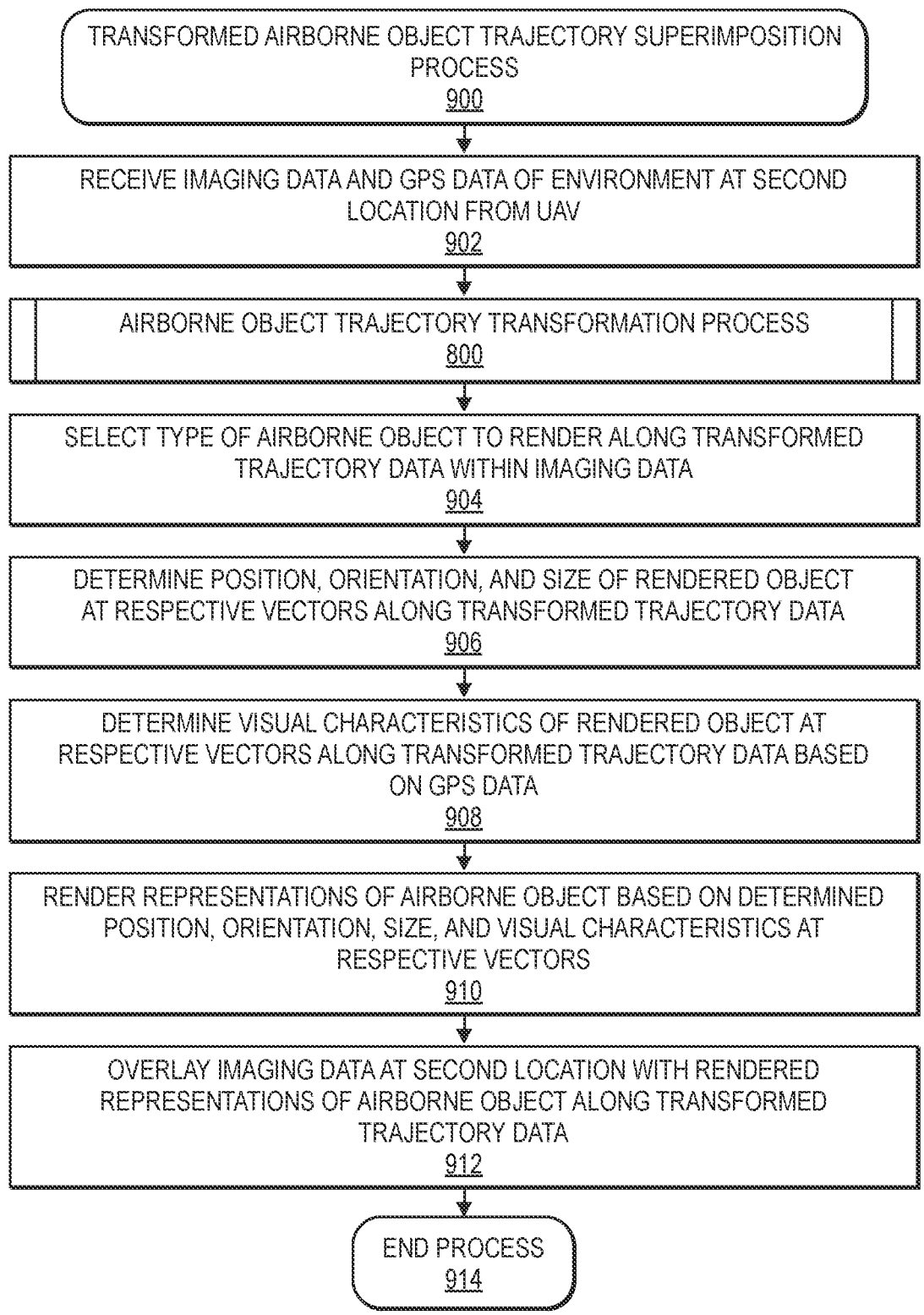
FIG. 9 is a flow diagram illustrating an example transformed airborne object trajectory superimposition process, in accordance with implementations of the present disclosure.

FIG. 9 is a flow diagram illustrating an example transformed airborne object trajectory superimposition process 900, in accordance with implementations of the present disclosure.

The process 900 may begin by receiving imaging data and GPS (global positioning system) data of an environment at a second location from an unmanned aerial vehicle, as at 902. For example, the imaging data may comprise a plurality of images or individual frames of imaging data of representations or portions of an environment captured by an imaging device onboard an aerial vehicle over time. Various position, orientation, and/or timestamp data or information of the aerial vehicle may be detected or measured, and associated with the imaging data or individual frames thereof. In addition, the position data may be detected or measured by various position detection devices or sensors onboard the aerial vehicle, and the orientation data may be detected or measured by various inertial navigation units, sensors, or components onboard the aerial vehicle. The imaging data may capture representations or portions of one or more environments, e.g., various environments different from an environment associated with actual trajectory data. Further, a control system may receive imaging data and associated position, orientation, and timestamp data of an environment at a second location from an aerial vehicle.

The process 900 may continue by performing the airborne object trajectory transformation process 800. For example, the airborne object trajectory transformation process 800, as described herein at least with respect to FIG. 8, may be performed to generate transformed trajectory data, e.g., synthetic trajectory, to be superimposed or overlaid onto or within the imaging data of the environment at the second location. Further, a control system may instruct performance of the airborne object trajectory transformation process 800 for the second location.

The process 900 may proceed by selecting a type of airborne object to render along the transformed trajectory data within the imaging data, as at 904. For example, the type of airborne object to render may be selected based on a known type or class of airborne object that is associated with the actual trajectory data. In this manner, an airborne object of a similar type or class may be selected for rendering along the transformed trajectory data, thereby ensuring logical or physically feasible renderings of types of airborne objects along transformed trajectory data. Further, a control system may select a type of airborne object to render along transformed trajectory data within imaging data.

The process 900 may continue to determine position, orientation, and size of the rendered object at respective vectors along the transformed trajectory data, as at 906. For example, based on the position and/or orientation data at respective points or vectors of the transformed trajectory data, and further based on the position and/or orientation data of the imaging device of the aerial vehicle that captured the imaging data, representations or images of a selected airborne object may be positioned and/or oriented at each of the respective points or vectors of the transformed trajectory data over time. In addition, based on the distances or ranges between the respective points or vectors of the transformed trajectory data and the imaging device of the aerial vehicle that captured the imaging data, sizes of the representations or images of the selected airborne object may be determined at each of the respective points or vectors of the transformed trajectory data over time. Further, a control system may determine positions, orientations, and sizes of the representations of the rendered airborne object at respective points or vectors of the transformed trajectory data.

The process 900 may proceed to determine visual characteristics of the rendered object at respective vectors along the transformed trajectory data based on GPS data, as at 908. For example, based on the position, orientation, and timestamp data associated with the imaging data captured by the imaging device of the aerial vehicle, visual characteristics, such as lighting, shadows, or others, of the representations or images of a selected airborne object may be determined at each of the respective points or vectors of the transformed trajectory data over time. In some examples, a position of the Sun may be determined based on the position, orientation, and timestamp data associated with the imaging data, in order to determine appropriate visual characteristics of the rendered object. In other examples, one or more sources of light within the imaging data may be determined or identified based on image processing of various portions of the imaging data, in order to determine appropriate visual characteristics of the rendered object. Further, a control system may determine visual characteristics of the representations of the rendered airborne object at respective points or vectors of the transformed trajectory data.

The process 900 may then continue with rendering representations of the airborne object based on the determined position, orientation, size, and visual characteristics at the respective vectors, as at 910. For example, for each of the plurality of points or vectors of the transformed trajectory data, an image or representation of the selected airborne object may be rendered according to the determined position, orientation, size, and visual characteristics. As described herein, the representations or images of the selected airborne object may be rendered using Renderman by Pixar, or various other types of image rendering applications, programs, or algorithms. Further, a control system may render the images or representations of the selected airborne object according to the determined characteristics at the respective vectors of the transformed trajectory data.

The process 900 may proceed with overlaying the imaging data at the second location with the rendered representations of the airborne object along the transformed trajectory data, as at 912. For example, the rendered images or representations of the selected airborne object may be superimposed or overlaid onto or within the imaging data of the environment at the second location. The images or representations may be rendered at respective vectors of the transformed trajectory data. In addition, the images or representations may be rendered along the transformed trajectory data according to timestamp data associated with the respective vectors and timestamp data associated with individual frames of the imaging data. By superimposing or overlaying the images or representations of the selected airborne object along the transformed trajectory data within the imaging data of the environment at the second location, training data including airborne object trajectory data may be generated including various types of airborne objects in various environments based on a single actual trajectory data of an airborne object within a different environment. Further, a control system may superimpose or overlay the rendered images or representations of the selected airborne object along the transformed trajectory data onto or within the imaging data of the environment at the second location.

The process 900 may then end, as at 914.

Using the systems and methods described herein, the substantially automatically generated training data including airborne object trajectory data within various environments may be provided as training inputs to one or more machine learning models, and airborne objects, encounter scenarios, and/or various data associated therewith may be provided as training outputs to one or more machine learning models. Thus, the automatically generated training data may be utilized to train one or more machine learning models to facilitate performance of various processes or tasks related to airborne objects and/or various encounter, collision, or near-collision scenarios, e.g., detection, identification, classification, recognition, tracking, determination of potential collisions or interferences, and/or other processes or tasks.

Figure 10:
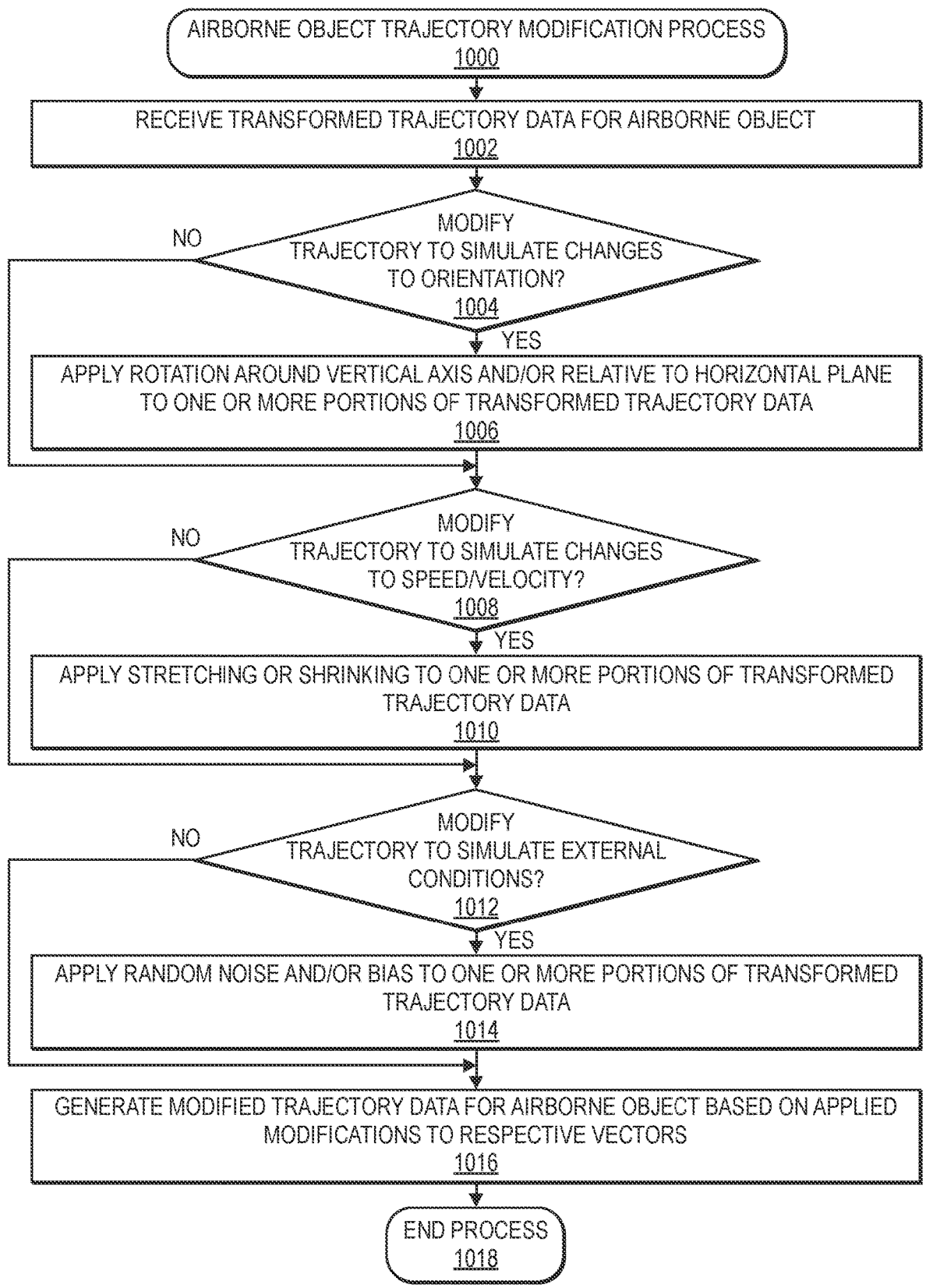
FIG. 10 is a flow diagram illustrating an example airborne object trajectory modification process, in accordance with implementations of the present disclosure.

FIG. 10 is a flow diagram illustrating an example airborne object trajectory modification process 1000, in accordance with implementations of the present disclosure.

As described herein, in some example embodiments, transformed trajectory data for an airborne object within a second environment that is generated based on actual trajectory data from an airborne object within a first environment may be further modified to simulate various types of changes to the transformed trajectory data, thereby generating additional training data that include further variations of airborne object trajectory data.

The process 1000 may begin by receiving transformed trajectory data for an airborne object, as at 1002. As described herein at least with respect to FIG. 8, transformed trajectory data within a second environment, e.g., synthetic trajectory, may be generated based on actual trajectory data detected or measured within a first environment, e.g., real trajectory. Further, a control system may generate and/or receive the transformed trajectory data for an airborne object within the second environment.

The process 1000 may continue by determining whether to modify the transformed trajectory data to simulate changes to orientation, as at 1004. For example, it may be determined whether to change or modify an approach angle or an orientation of flight or navigation of an airborne object within the second environment. Further, a control system may determine whether to modify the transformed trajectory data to simulate changes to approach angle or orientation.

If it is determined that the transformed trajectory data is to be modified to simulate changes to orientation, the process 1000 may proceed by applying rotation around a vertical axis and/or relative to a horizontal plane to one or more portions of the transformed trajectory data, as at 1006. For example, the transformed trajectory data, or one or more portions thereof, may be rotated about a vertical axis to simulate a change to an approach angle of an airborne object, e.g., simulated changes to yaw of an airborne object. In this respect, the transformed trajectory data may be rotated about a vertical axis associated with any of the various points or vectors of the transformed trajectory data and/or by various angles or amounts to generate a modified transformed trajectory. In addition, the transformed trajectory data, or one or more portions thereof, may be rotated relative to a horizontal plane to simulate changes to roll and/or pitch of an airborne object. In this respect, the transformed trajectory data may be rotated about a generally horizontal axis associated with any of the various points or vectors of the transformed trajectory data and/or by various angles or amounts to generate a modified transformed trajectory. Further, a control system may apply rotation around one or more axes to simulate changes to approach angle or orientation of the transformed trajectory data.

If it is determined that the transformed trajectory data is not to be modified to simulate changes to orientation, or subsequent to modifying the transformed trajectory data to simulate changes to orientation, the process 1000 may continue to determine whether to modify the transformed trajectory data to simulate changes to speed and/or velocity, as at 1008. For example, it may be determined whether to change or modify a speed, velocity, turning radius, and/or other aspects of flight or navigation of an airborne object within the second environment. Further, a control system may determine whether to modify the transformed trajectory data to simulate changes to speed, velocity, turning radius, and/or other aspects.

If it is determined that the transformed trajectory data is to be modified to simulate changes to speed, velocity, turning radius, and/or other aspects of flight or navigation, the process 1000 may proceed to apply stretching or shrinking, e.g., scaling, to one or more portions of the transformed trajectory data, as at 1010. For example, the transformed trajectory data, or one or more portions thereof, may be stretched, extended, or expanded to simulate an increase in speed, velocity, turning radius, or other aspects. In this respect, one or more portions of the transformed trajectory data may be stretched generally along directions of associated vectors of the transformed trajectory data and/or by various amounts or levels to generate a modified transformed trajectory. In addition, the transformed trajectory data, or one or more portions thereof, may be shrunken, retracted, or contracted to simulate a decrease in speed, velocity, turning radius, or other aspects. In this respect, one or more portions of the transformed trajectory data may be shrunken generally along directions of associated vectors of the transformed trajectory data and/or by various amounts or levels to generate a modified transformed trajectory. Further, a control system may apply scaling to one or more vectors or portions to simulate changes to speed, velocity, turning radius, or other aspects of the transformed trajectory data.

If it is determined that the transformed trajectory data is not to be modified to simulate changes to speed, velocity, turning radius, and/or other aspects of flight or navigation, or subsequent to modifying the transformed trajectory data to simulate changes to speed, velocity, turning radius, and/or other aspects of flight or navigation, the process 1000 may continue with determining whether to modify the transformed trajectory data to simulate external conditions, as at 1012. For example, it may be determined whether to simulate external conditions, such as wind, crosswinds, turbulence, other external conditions, measurement errors or noise, and/or other random or systematic changes for an airborne object within the second environment. Further, a control system may determine whether to modify the transformed trajectory data to simulate external conditions.

If it is determined that the transformed trajectory data is to be modified to simulate external conditions, the process 1000 may proceed with applying random noise and/or bias to one or more portions of the transformed trajectory data, as at 1014. For example, the transformed trajectory data, or one or more portions thereof, may be systematically or consistently biased in a particular direction to simulate effective wind from the particular direction that affects flight or navigation of the airborne object. In this respect, one or more portions of the transformed trajectory data may be moved, pushed, pulled, or biased generally along the particular direction of the systematic bias and/or by various amounts or levels to generate a modified transformed trajectory. In addition, the transformed trajectory data, or one or more portions thereof, may be randomly biased or shifted in different directions to simulate crosswinds, turbulence, other external conditions, or measurement errors or noise that affect flight or navigation of the airborne object. In this respect, one or more portions of the transformed trajectory data may be moved, pushed, pulled, or biased generally toward various different directions and/or by various amounts or levels to generate a modified transformed trajectory. Further, a control system may apply random noise and/or bias to one or more vectors or portions to simulate external conditions that affect or modify the transformed trajectory.

In additional example embodiments, the transformed trajectory data may be translated to different positions within a second environment to simulate a change to a position of an airborne object. In this respect, the transformed trajectory data may be translated to various new or different positions within the second environment to generate a modified transformed trajectory.

The process 1000 may then continue by generating modified trajectory data for a selected airborne object based on the applied modifications to respective vectors, as at 1016. For example, various types of modifications described herein, and/or combinations thereof, may be applied to a transformed trajectory within a second environment that is generated based on an actual trajectory that is detected or measured within a first environment. As described herein, the various modifications to transformed trajectories within an environment may be generated using 3DS Max (3D Studio Max) by Autodesk, Maya by Autodesk, Blender (an open-source application), or various other types of point, vector, and/or trajectory modification applications, programs, or algorithms. By applying various types or combinations of modifications to transformed trajectories within different environments, additional types and variations of training data including airborne object trajectory data may be generated. As described herein, representations or images of various airborne objects may be superimposed or overlaid along the modified and transformed trajectories within various environments to substantially automatically generate the training data. Then, various machine learning models or algorithms used for computer vision applications may be trained using the training data, e.g., to detect, identify, classify, and/or recognize airborne objects and associated encounter scenarios in various environments. Further, a control system may generate the modified trajectory data for various airborne objects within various environments.

The process 1000 may then end, as at 1018.

Figure 11:
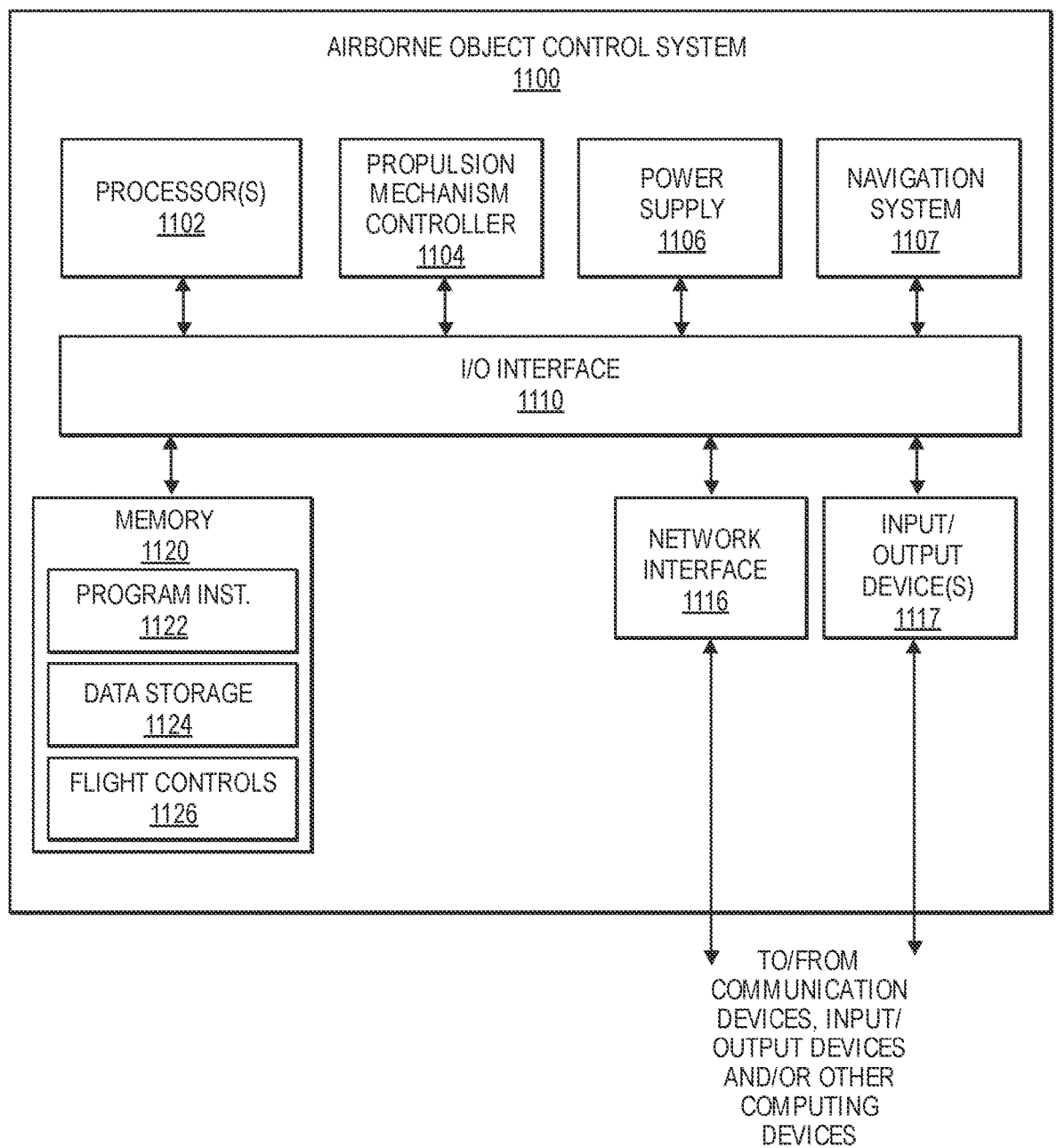
FIG. 11 is a block diagram illustrating various components of an example airborne object control system, in accordance with implementations of the present disclosure.

FIG. 11 is a block diagram illustrating various components of an example airborne object control system 1100, in accordance with implementations of the present disclosure.

In various examples, the block diagram may be illustrative of one or more aspects of the airborne object control system 1100 that may be used to implement the various systems and processes discussed above. In the illustrated implementation, the airborne object control system 1100 includes one or more processors 1102, coupled to a non-transitory computer readable storage medium 1120 via an input/output (I/O) interface 1110. The airborne object control system 1100 may also include a propulsion mechanism controller 1104, a power supply or battery 1106, and/or a navigation system 1107. The airborne object control system 1100 may further include a network interface 1116, and one or more input/output devices 1117.

In various implementations, the airborne object control system 1100 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, flight or navigation data, and various data associated with the airborne object, including airborne object data, airborne object type or class, airborne object position data, airborne object orientation data, timestamp data, and/or other data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and flight controls 1126, respectively. In other implementations, program instructions, flight data and/or other data may be received, sent or stored upon different types of computer-accessible media, such as non-transitory media, or on similar media separate from the non-transitory computer readable storage medium 1120 or the airborne object control system 1100.

Generally, a non-transitory, computer readable storage medium may include storage media or memory media such as magnetic or optical media, e.g., disk or CD/DVD-ROM, coupled to the airborne object control system 1100 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface 1116 or other peripheral interfaces, such as input/output devices 1117. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The propulsion mechanism controller 1104 communicates with the navigation system 1107 and adjusts the operational characteristics of propulsion mechanisms to guide the airborne object along a determined path and/or to perform other navigational maneuvers. The navigation system 1107 may include an inertial navigation system, accelerometer, gyroscope, magnetometer, global positioning system (GPS) device, system, or sensor, or other position detection system, device, or sensor that can be used to navigate the airborne object to and/or from a location, as well as to detect, measure, or capture position and/or orientation data of the airborne object.

The network interface 1116 may be configured to allow data to be exchanged between the airborne object control system 1100, other devices attached to a network, such as other computer systems, control systems, and/or control systems of other airborne objects, vehicles, systems, or devices. For example, the network interface 1116 may enable wireless communication between numerous airborne objects. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1117 may, in some implementations, include one or more displays, imaging sensors, image capture devices, thermal sensors, infrared sensors, time of flight sensors, inertial measurement units, accelerometers, gyroscopes, pressure sensors, weather sensors, various other sensors described herein, etc. Multiple input/output devices 1117 may be present and controlled by the airborne object control system 1100. One or more of these sensors may be utilized to assist in performing the various functions, operations, and processes described herein.

As shown in FIG. 11, the memory may include program instructions 1122 which may be configured to implement the example processes and/or sub-processes described above. The data storage 1124 may include various data stores for maintaining data items that may be provided for performing the various functions, operations, and processes described herein. For example, the data storage 1124 may include various data associated with the airborne object, airborne object type or class, airborne object position data, airborne object orientation data, timestamp data, and/or other data items. In some examples, the timestamp data may be defined with respect to a common time reference, such as GPS time.

Those skilled in the art will appreciate that the airborne object control system 1100 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The airborne object control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While some of the above examples of airborne objects have been described with respect to helicopters or fixed-wing aircraft, the disclosed implementations may also be used for other forms of airborne objects, including, but not limited to, airplanes, jets, gliders, other fixed-wing aircraft, helicopters, multirotor aircraft, unmanned or manned drones, partially or fully autonomous aerial vehicles, birds, and/or other types of airborne objects.

Figure 12:
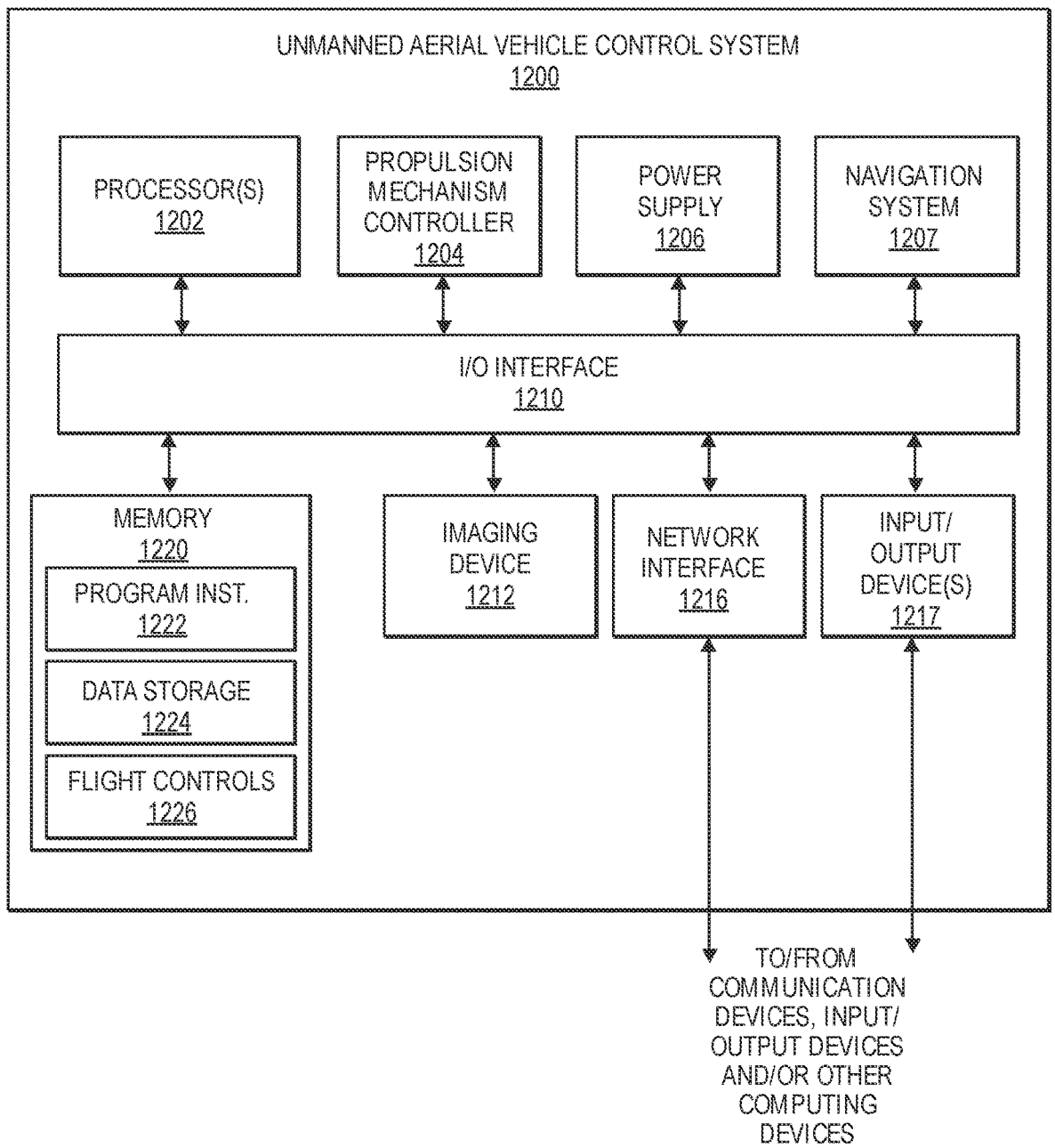
FIG. 12 is a block diagram illustrating various components of an example unmanned aerial vehicle control system, in accordance with implementations of the present disclosure.

FIG. 12 is a block diagram illustrating various components of an example unmanned aerial vehicle control system 1200, in accordance with implementations of the present disclosure.

In various examples, the block diagram may be illustrative of one or more aspects of the aerial vehicle control system 1200 that may be used to implement the various systems and processes discussed above. In the illustrated implementation, the aerial vehicle control system 1200 includes one or more processors 1202, coupled to a non-transitory computer readable storage medium 1220 via an input/output (I/O) interface 1210. The aerial vehicle control system 1200 may also include a propulsion mechanism controller 1204, a power supply or battery 1206, and/or a navigation system 1207. The aerial vehicle control system 1200 may further include an imaging device 1212, a network interface 1216, and one or more input/output devices 1217.

In various implementations, the aerial vehicle control system 1200 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, flight or navigation data, and various data associated with the aerial vehicle, imaging device, and/or imaging data, including aerial vehicle data, aerial vehicle position data, aerial vehicle orientation data, imaging device data, imaging data, imaging device position and orientation data, timestamp data, and/or other data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and flight controls 1226, respectively. In other implementations, program instructions, flight data and/or other data may be received, sent or stored upon different types of computer-accessible media, such as non-transitory media, or on similar media separate from the non-transitory computer readable storage medium 1220 or the aerial vehicle control system 1200.

Generally, a non-transitory, computer readable storage medium may include storage media or memory media such as magnetic or optical media, e.g., disk or CD/DVD-ROM, coupled to the aerial vehicle control system 1200 via the I/O interface 1210. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1217. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propulsion mechanism controller 1204 communicates with the navigation system 1207 and adjusts the operational characteristics of propulsion mechanisms to guide the aerial vehicle along a determined path and/or to perform other navigational maneuvers. The navigation system 1207 may include an inertial navigation system, accelerometer, gyroscope, magnetometer, global positioning system (GPS) device, system, or sensor, or other position detection system, device, or sensor that can be used to navigate the aerial vehicle to and/or from a location, as well as to detect, measure, or capture position and/or orientation data of the aerial vehicle, as well as position and/or orientation data of the imaging device relative to the aerial vehicle.

The aerial vehicle control system 1200 may also include an imaging device 1212. The imaging device 1212 may comprise various types of imaging devices, cameras, or sensors, such as an RGB camera, analog camera, digital camera, video camera, stereo 3D camera, depth sensor, or other types of imaging sensors or devices. The imaging device 1212 may be coupled to the vehicle and may capture imaging data of various environments at various positions and orientations of the vehicle and/or imaging device. Further, the imaging data may be transmitted, stored, or processed to include superimpositions of transformed trajectories to facilitate performance of various processes or tasks, including detection, identification, classification, recognition, tracking, determination of potential collisions or interferences, or other processes or tasks, as further described herein.

The network interface 1216 may be configured to allow data to be exchanged between the aerial vehicle control system 1200, other devices attached to a network, such as other computer systems, control systems, and/or control systems of other aerial vehicles, systems, or devices. For example, the network interface 1216 may enable wireless communication between numerous aerial vehicles. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1217 may, in some implementations, include one or more displays, imaging sensors, image capture devices, thermal sensors, infrared sensors, time of flight sensors, inertial measurement units, accelerometers, gyroscopes, pressure sensors, weather sensors, various other sensors described herein, etc. Multiple input/output devices 1217 may be present and controlled by the aerial vehicle control system 1200. One or more of these sensors may be utilized to assist in performing the various functions, operations, and processes described herein.

As shown in FIG. 12, the memory may include program instructions 1222 which may be configured to implement the example processes and/or sub-processes described above. The data storage 1224 may include various data stores for maintaining data items that may be provided for performing the various functions, operations, and processes described herein. For example, the data storage 1224 may include various data associated with the aerial vehicle, imaging device, and/or imaging data, including aerial vehicle data, aerial vehicle position data, aerial vehicle orientation data, imaging device data, imaging data, imaging device position and orientation data, timestamp data, and/or other data items. In some examples, the timestamp data may be defined with respect to a common time reference, such as GPS time.

Those skilled in the art will appreciate that the aerial vehicle control system 1200 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The aerial vehicle control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While some of the above examples of aerial vehicles have been described with respect to unmanned drones or unmanned aerial vehicles, the disclosed implementations may also be used for other forms of aerial vehicles, including, but not limited to, airplanes, jets, gliders, other fixed-wing aircraft, helicopters, multirotor aircraft, unmanned or manned drones, partially or fully autonomous aerial vehicles, and/or other types of aerial vehicles.

Figure 13:
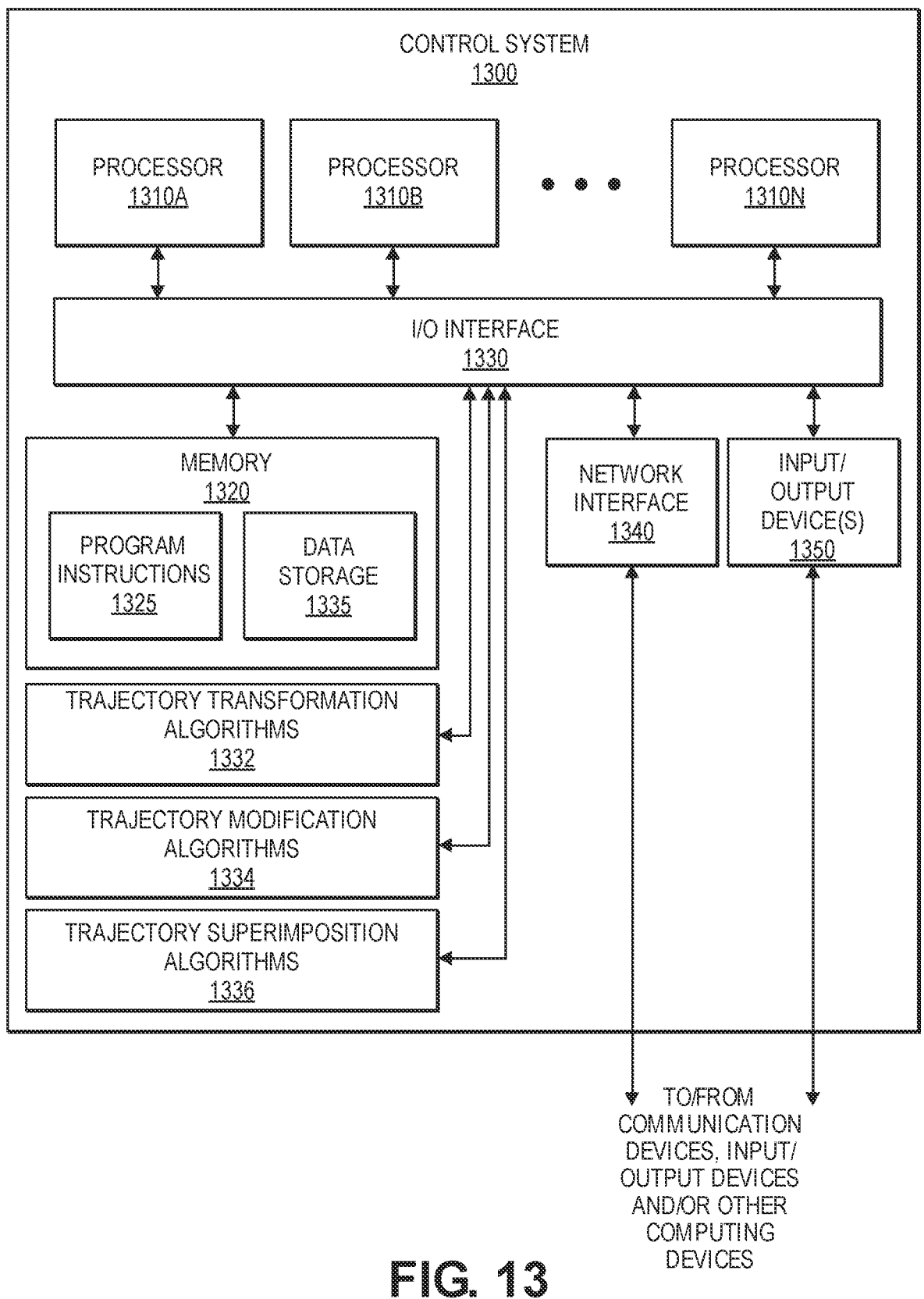
FIG. 13 is a block diagram illustrating various components of an example control system, in accordance with implementations of the present disclosure.

FIG. 13 is a block diagram illustrating various components of an example control system 1300, in accordance with implementations of the present disclosure.

Various operations of a control system or controller, such as those described herein, may be executed on one or more computer systems, and/or interact with various other computers, systems, or devices, according to various implementations. For example, the control system or controller discussed above may function and operate on one or more computer systems. One such control system is illustrated by the block diagram in FIG. 13. In the illustrated implementation, a control system 1300 includes one or more processors 1310A, 1310B through 1310N, coupled to a non-transitory computer-readable storage medium 1320 via an input/output (I/O) interface 1330. The control system 1300 further includes a network interface 1340 coupled to the I/O interface 1330, and one or more input/output devices 1350. In some implementations, it is contemplated that a described implementation may be implemented using a single instance of the control system 1300 while, in other implementations, multiple such systems or multiple nodes making up the control system 1300 may be configured to host different portions or instances of the described implementations. For example, in one implementation, some data sources or services (e.g., related to portions of automatic training data generation systems, operations, or processes, etc.) may be implemented via one or more nodes of the control system 1300 that are distinct from those nodes implementing other data sources or services (e.g., related to other portions of automatic training data generation systems, operations, or processes, etc.).

In various implementations, the control system 1300 may be a uniprocessor system including one processor 1310A, or a multiprocessor system including several processors 1310A-1310N (e.g., two, four, eight, or another suitable number). The processors 1310A-1310N may be any suitable processor capable of executing instructions, such as graphics processing units (GPUs) or other types of processors. For example, in various implementations, the processors 1310A-1310N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1310A-1310N may commonly, but not necessarily, implement the same ISA.

The non-transitory computer-readable storage medium 1320 may be configured to store executable instructions and/or data accessible by the one or more processors 1310A-1310N. In various implementations, the non-transitory computer-readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1320 as program instructions 1325 and data storage 1335, respectively. In other implementations, program instructions and/or data may be received, sent or stored upon different types of computer-accessible media, such as non-transitory media, or on similar media separate from the non-transitory computer-readable storage medium 1320 or the control system 1300. Generally speaking, a non-transitory, computer-readable storage medium may include storage media or memory media such as magnetic or optical media, e.g., disk or CD/DVD-ROM, coupled to the control system 1300 via the I/O interface 1330. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1340.

In one implementation, the I/O interface 1330 may be configured to coordinate I/O traffic between the processors 1310A-1310N, the non-transitory computer-readable storage medium 1320, and any peripheral devices, including the network interface 1340 or other peripheral interfaces, such as input/output devices 1350. In some implementations, the I/O interface 1330 may perform any necessary protocol, timing or other data transformations to convert data signals from one component (e.g., non-transitory computer-readable storage medium 1320) into a format suitable for use by another component (e.g., processors 1310A-1310N). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer-readable storage medium 1320, may be incorporated directly into the processors 1310A-1310N.

The network interface 1340 may be configured to allow data to be exchanged between the control system 1300 and other devices attached to a network, such as other control systems, airborne object control systems, aerial vehicle control systems, image capture systems, image processing systems (which may include machine learning models, algorithms, or techniques), other computer systems, various types of sensors, various types of imaging devices or sensors, or between nodes of the control system 1300. In various implementations, the network interface 1340 may support communication via wired or wireless general data networks, such as any suitable type of Ethernet network.

Input/output devices 1350 may, in some implementations, include one or more displays, projection devices, scanning devices, imaging devices, sensors, other visual input/output devices, microphones, speakers, other audio input/output devices, keyboards, keypads, touchpads, photo eyes, proximity sensors, RFID readers, voice or optical recognition devices, or any other devices suitable for entering or retrieving data by one or more control systems 1300. Multiple input/output devices 1350 may be present in the control system 1300 or may be distributed on various nodes of the control system 1300. In some implementations, similar input/output devices may be separate from the control system 1300 and may interact with one or more nodes of the control system 1300 through a wired or wireless connection, such as over the network interface 1340.

As shown in FIG. 13, the memory 1320 may include program instructions 1325 that may be configured to implement one or more of the described implementations and/or provide data storage 1335, which may comprise various tables, data stores and/or other data structures accessible by the program instructions 1325. The program instructions 1325 may include various executable instructions, programs, or applications to facilitate various operations and processes described herein, such as airborne object controllers, drivers, or applications, airborne object trajectory processing controllers, drivers, or applications, aerial vehicle controllers, drivers, or applications, imaging device controllers, drivers, or applications, imaging data processing controllers, drivers, or applications, computer graphics controllers, drivers, or applications, machine learning model controllers, drivers, or applications, etc. The data storage 1335 may include various data stores for maintaining data related to systems, operations, or processes described herein, such as various data associated with airborne objects including position, orientation, and timestamp data, airborne object trajectories, aerial vehicles including position, orientation, and timestamp data, imaging devices, imaging data, other data described herein, etc. In some examples, the timestamp data may be defined with respect to a common time reference, such as GPS time.

The control system 1300 may also include trajectory transformation algorithms 1332. For example, the trajectory transformation algorithms 1332 may receive and process the actual trajectory data for airborne objects in first environments in order to generate transformed trajectory data for airborne objects in second environments, as further described herein at least with respect to FIGS. 5, 6, and 8.

The control system 1300 may also include trajectory modification algorithms 1334. For example, the trajectory modification algorithms 1334 may receive and process transformed trajectory data for airborne objects in various second environments in order to generate modified and transformed trajectory data for airborne objects in various second environments to simulate various changes, modifications, or adjustments to the transformed trajectory data, as further described herein at least with respect to FIGS. 7 and 10.

The control system 1300 may also include trajectory superimposition algorithms 1336. For example, the trajectory superimposition algorithms may receive and process imaging data and transformed trajectory data at various second environments in order to superimpose or overlay representations or images of various airborne objects along the transformed trajectory data onto or within the imaging data of the various second environments, thereby generating training data including airborne object trajectory data, as further described herein at least with respect to FIG. 9. The trajectory superimposition algorithms may comprise various types of computer graphics applications or algorithms to render and overlay representations or images of various airborne objects along transformed trajectory data onto or within imaging data at various second environments.

Those skilled in the art will appreciate that the control system 1300 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to flow charts shown in FIGS. 8-10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to generate training data including airborne object trajectory data, comprising:
    receiving, by a control system from an airborne object, an actual trajectory in a first environment;
    determining, by the control system, an elevation difference between the first environment and a second environment;
    adjusting, by the control system, the actual trajectory based on the elevation difference;
    randomly selecting, by the control system, an end point vector for a transformed trajectory in the second environment;
    determining, by the control system, a rotation matrix based on a transformation difference between an end point vector of the actual trajectory and the end point vector for the transformed trajectory;
    determining, by the control system for each vector of the actual trajectory, a respective delta between a respective vector and the end point vector of the actual trajectory;
    determining, by the control system for each vector of the actual trajectory, a respective transformed vector of the transformed trajectory based on the rotation matrix and a respective delta;
    generating, by the control system, the transformed trajectory based on the end point vector for the transformed trajectory in the second environment and the respective transformed vectors;
    receiving, by the control system from an unmanned aerial vehicle, imaging data of the second environment; and
    causing, by the control system, superimposition of the transformed trajectory within the imaging data of the second environment.

2. The computer-implemented method of claim 1, wherein the actual trajectory of the airborne object in the first environment is received from a global positioning system device and an inertial navigation system onboard the airborne object; and
    wherein the imaging data of the second environment is received from an imaging device onboard the unmanned aerial vehicle.

3. The computer-implemented method of claim 1, wherein the end point vector for the transformed trajectory in the second environment is randomly selected from a plurality of end point vectors that are within a first threshold volume around a position of the unmanned aerial vehicle in the second environment.

4. The computer-implemented method of claim 1, wherein causing superimposition of the transformed trajectory within the imaging data of the second environment further comprises:
    selecting, by the control system, a type of object to render along the transformed trajectory;
    determining, by the control system, at least one of a position, orientation, or size of the object to be rendered based on the respective transformed vectors and the end point vector for the transformed trajectory;
    rendering, by the control system, respective representations of the object at the respective transformed vectors and the end point vector for the transformed trajectory; and
    overlaying, by the control system, the respective representations of the object along the transformed trajectory within the imaging data of the second environment.

5. A method, comprising:
    receiving, by a control system from an airborne object, an actual trajectory in a first environment;
    transforming, by the control system, the actual trajectory in the first environment to a transformed trajectory in a second environment by at least:
        determining, by the control system, an elevation difference between the first environment and the second environment; and
        adjusting, by the control system, the actual trajectory to the transformed trajectory based on the elevation difference;
    receiving, by the control system from an aerial vehicle, imaging data of the second environment; and
    causing, by the control system, superimposition of the transformed trajectory within the imaging data of the second environment.

6. The method of claim 5, wherein the actual trajectory of the airborne object in the first environment is received from at least one of a global positioning system device or an inertial navigation system onboard the airborne object.

7. The method of claim 5, wherein transforming the actual trajectory to the transformed trajectory further comprises:
    selecting, by the control system, a vector for the transformed trajectory in the second environment; and
    determining, by the control system, a rotation matrix based on a transformation difference between a corresponding vector of the actual trajectory and the selected vector for the transformed trajectory.

8. The method of claim 7, wherein transforming the actual trajectory to the transformed trajectory further comprises:

determining, by the control system for each vector of the actual trajectory, a respective delta between a respective vector and the selected vector of the actual trajectory;

determining, by the control system for each vector of the actual trajectory, a respective transformed vector of the transformed trajectory based on the rotation matrix and a respective delta; and generating, by the control system, the transformed trajectory based on the selected vector for the transformed trajectory in the second environment and the respective transformed vectors.

9. The method of claim 7, wherein the selected vector for the transformed trajectory in the second environment is selected from a plurality of vectors that are within a first threshold volume around a position of the aerial vehicle in the second environment.

10. The method of claim 7, wherein the selected vector for the transformed trajectory in the second environment comprises an end point vector for the transformed trajectory.

11. The method of claim 5, wherein the imaging data of the second environment is received from an imaging device onboard the aerial vehicle.

12. The method of claim 11, further comprising:
receiving, by the control system from the aerial vehicle, navigation data associated with the imaging data of the second environment;
wherein the navigation data comprises position and orientation data of at least one of the imaging device or the aerial vehicle.

13. The method of claim 5, wherein the airborne object comprises at least one of a helicopter, a drone, a fixed-wing aircraft, a manned aircraft, or an unmanned aircraft; and
wherein the aerial vehicle comprises at least one of an unmanned aerial vehicle or a manned aerial vehicle.

14. The method of claim 5, further comprising:
modifying, by the control system, the transformed trajectory to be superimposed within the imaging data of the second environment.

15. The method of claim 14, wherein modifying the transformed trajectory further comprises at least one of:
translating, by the control system, the transformed trajectory to a new position within the second environment;
rotating, by the control system, the transformed trajectory at least one of around a vertical axis or relative to a horizontal plane within the second environment;
adjusting, by the control system, a scale of one or more vectors of the transformed trajectory within the second environment; or
applying, by the control system, at least one of a bias or shift to one or more vectors of the transformed trajectory within the second environment.

16. A system, comprising:
an airborne object having at least one of a global positioning system device or an inertial navigation system;
an unmanned aerial vehicle having at least one imaging device; and
a control system in communication with the airborne object and the unmanned aerial vehicle, the control system configured to at least:
receive, from the airborne object, an actual trajectory in a first environment;
transform the actual trajectory in the first environment to a transformed trajectory in a second environment by at least:
determining an elevation difference between the first environment and the second environment; and
adjusting the actual trajectory to the transformed trajectory based on the elevation difference;
receive, from the unmanned aerial vehicle, imaging data and navigation data of the second environment; and
cause superimposition of the transformed trajectory within the imaging data of the second environment.

17. The system of claim 16, wherein the actual trajectory comprises at least one of:
latitude, longitude, and altitude information received from the global positioning device;
timestamp information received from the global positioning device; or
orientation, bearing, and heading information received from the inertial navigation system.

18. The system of claim 16, wherein the unmanned aerial vehicle further includes at least one of a second global positioning device or a second inertial navigation system.

19. The system of claim 18, wherein the navigation data comprises at least one of:
second latitude, longitude, and altitude information received from the second global positioning device;
second timestamp information received from the second global positioning device; or
second orientation, bearing, and heading information received from the second inertial navigation system.

* * * * *